United States Patent
Kawakami

(10) Patent No.: US 9,434,443 B2
(45) Date of Patent: Sep. 6, 2016

(54) CABLE OPERATING MECHANISM

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 2451 days.

(21) Appl. No.: 12/193,109

(22) Filed: Aug. 18, 2008

(65) Prior Publication Data

US 2010/0037724 A1    Feb. 18, 2010

(51) Int. Cl.
*B62K 23/06* (2006.01)
*B62M 25/04* (2006.01)

(52) U.S. Cl.
CPC .............. *B62K 23/06* (2013.01); *B62M 25/04* (2013.01); *Y10T 74/20402* (2015.01); *Y10T 74/20438* (2015.01); *Y10T 74/20624* (2015.01)

(58) Field of Classification Search
USPC .............. 74/502.2, 488, 489, 473.14, 473.15
See application file for complete search history.

(56) References Cited

U.S. PATENT DOCUMENTS

| | | | |
|---|---|---|---|
| 5,355,745 A | 10/1994 | Wu et al. | |
| 5,622,083 A | 4/1997 | Kirimoto et al. | |
| 6,397,700 B1 | 6/2002 | Liu et al. | |
| 6,502,477 B1 * | 1/2003 | Assel | 74/502.2 |
| 7,252,300 B2 * | 8/2007 | Hargroder | 74/502.2 |
| 2007/0068316 A1* | 3/2007 | Kawakami et al. | 74/502.2 |
| 2007/0137386 A1* | 6/2007 | Kawakami | 74/502.2 |
| 2008/0202277 A1* | 8/2008 | Miki | 74/502.2 |

FOREIGN PATENT DOCUMENTS

| | | |
|---|---|---|
| DE | 91 15 661 U1 | 3/1992 |
| EP | 1 854 713 A2 | 11/2007 |
| EP | 1 914 159 A1 | 4/2008 |
| EP | 1 985 530 A2 | 10/2008 |
| EP | 2 008 928 A2 | 12/2008 |
| FR | 1 190 389 A | 10/1959 |
| GB | 723953 A | 2/1955 |
| WO | WO 9503208 A1 * | 2/1995 |

OTHER PUBLICATIONS

Description of WO9503208. European Patent Office. http://translationportal.epo.org/emtp/translate/?ACTION=description-retrieval&COUNTRY=WO&ENGINE=google&FORMAT=docdb&KIND=A1&LOCALE=en_EP&NUMBER=9503208&OPS=ops.epo.org&SRCLANG=de&TRGLANG=en.*

* cited by examiner

*Primary Examiner* — Daniel Yabut
(74) *Attorney, Agent, or Firm* — Global IP Counselors

(57) ABSTRACT

A cable operating mechanism basically comprises a fixed member, a wire takeup member, a single position maintaining abutment and a positioning member. The wire takeup member is movably mounted with respect to the fixed member. The single position maintaining abutment movably mounted with the wire takeup member. The positioning member is pivotally mounted with respect to the fixed member. The positioning member has a plurality of positioning abutments configured to engage the single position maintaining abutment such that the wire takeup member is positioned in one of a plurality of predetermined wire positions.

30 Claims, 20 Drawing Sheets

CABLE OPERATING MECHANISM

BACKGROUND OF THE INVENTION

1. Field of the Invention

This invention generally relates to a cable operating mechanism. More specifically, the present invention relates to a cable operating mechanism that pulls and releases an inner wire of a cable.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Many components of a bicycle are operated by a cable that is pulled and released by a cable operating mechanism. There exist many different types of cable operating mechanisms. For example, a bicycle transmission typically includes front and rear shift operating devices that are designed to operate front and rear derailleurs. Some cable operating mechanisms use a single lever, while other cable operating mechanisms use a pair of lever. Also some cable operating mechanisms use rotating hand grips to wind and release the inner wire of the control cable. Many of the cable operating mechanisms pull and release the inner wire of the cable one step at a time. However, some cable operating mechanisms are capable of selectively releasing the inner wire of the cable one or two steps at a time. These types prior cable operating mechanisms with a multiple release action can be complicated and/or expensive to manufacture and assemble. Furthermore, these prior cable operating mechanisms with a multiple release action can sometimes be heavy and/or cumbersome.

In view of the above, it will be apparent to those skilled in the art from this disclosure that there exists a need for an improved cable operating mechanism. This invention addresses this need in the art as well as other needs, which will become apparent to those skilled in the art from this disclosure.

SUMMARY OF THE INVENTION

One object of the present invention is to provide a cable operating mechanism that is relatively easy to manufacture and assemble at a relatively low cost.

Another object of the present invention is to provide a cable operating mechanism having a multiple release action with a relatively simple structure.

In accordance with one aspect, a cable operating mechanism is provided that basically comprises a fixed member, a wire takeup member, a single position maintaining abutment and a positioning member. The wire takeup member is movably mounted with respect to the fixed member. The single position maintaining abutment movably mounted with the wire takeup member. The positioning member is pivotally mounted with respect to the fixed member. The positioning member has a plurality of positioning abutments configured to engage the single position maintaining abutment such that the wire takeup member is positioned in one of a plurality of predetermined wire positions.

In accordance with another aspect, a cable operating mechanism is provided that basically comprises a fixed member, a wire takeup member, a positioning member and a wire releasing member. The wire takeup member is pivotally mounted with respect to the fixed member about a first pivot axis. The positioning member is pivotally mounted with respect to the fixed member about a second pivot axis that is offset from the first pivot axis. The positioning member includes a plurality of positioning abutments configured to selectively maintain the wire takeup member in one of predetermined wire positions. The wire releasing member includes a plurality of release abutments configured to selectively engage the positioning member to move the positioning member during a wire releasing operation of the wire releasing member.

In accordance with another aspect, a cable operating mechanism is provided that basically comprises a fixed member, a wire takeup member, a driven abutment and a wire pulling member. The wire takeup member is pivotally mounted with respect to the fixed member. The driven abutment moves with wire takeup member. The wire pulling member is movably mounted with respect to the fixed member. The wire pulling member includes a plurality of drive abutments configured to be selectively engaged with the driven abutment to drive the driven abutment such that the wire takeup member is moved by the wire pulling member during a wire pulling operation of the wire pulling member.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
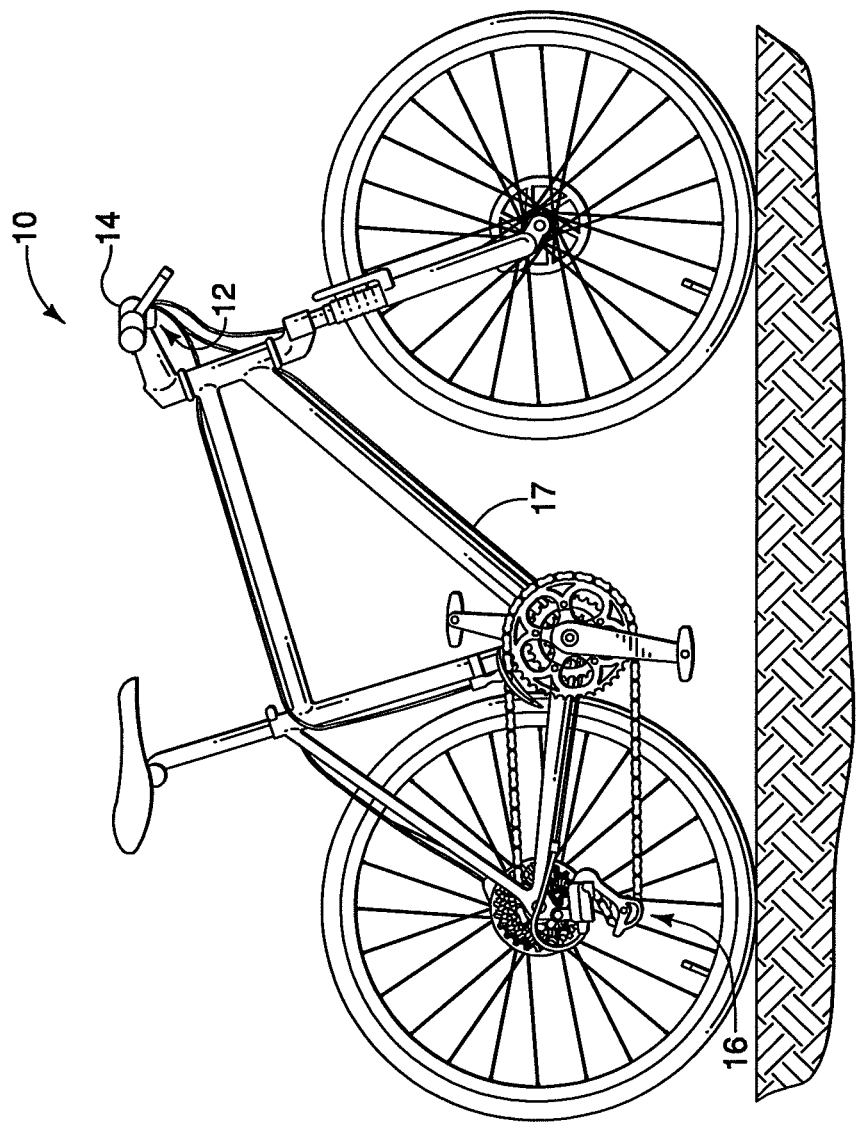
FIG. 1 is a side elevational view of a bicycle equipped with a bicycle cable operating mechanism in accordance with one embodiment.

Referring initially to FIG. 1, a bicycle 10 is illustrated equipped with a bicycle cable operating mechanism 12 in accordance with one embodiment. The bicycle cable operating mechanism 12 is a right hand side control device that is mounted on the right side of a handlebar 14 so as to be operated by the rider's right hand. However, the bicycle cable operating mechanism 12 can be adapted to be mounted left side of the handlebar 14 as needed and/or desired.

Preferably, the bicycle cable operating mechanism 12 is a shift control device for controlling a part of a bicycle drive train such as a rear derailleur 16 of the bicycle 10. The rear derailleur 16 is a nine speed (gear) top normal derailleur that has a spring normally biasing the chain guide to a top gear position (i.e., the gear position farthest from the center plane of the bicycle). A shift operating cable 17 operatively connects the rear derailleur 16 to the bicycle cable operating mechanism 12. Preferably, the shift operating cable 17 is a conventional bicycle control cable that has an inner wire 17*a* that is covered by an outer casing 17*b*. In other words, the shift operating cable 17 basically includes the inner wire 17*a* slidably received within the outer casing 17*b*. Thus, operation of the bicycle cable operating mechanism 12 moves the rear derailleur 16 between at least two different gear positions by selectively pulling or releasing the inner wire 17*a* of the shift operating cable 17. In the illustrated embodiment, the fully released position corresponds to the ninth gear position of the rear derailleur 16, while the fully pulled position corresponds to the first gear position of the rear derailleur 16.

Figure 2:
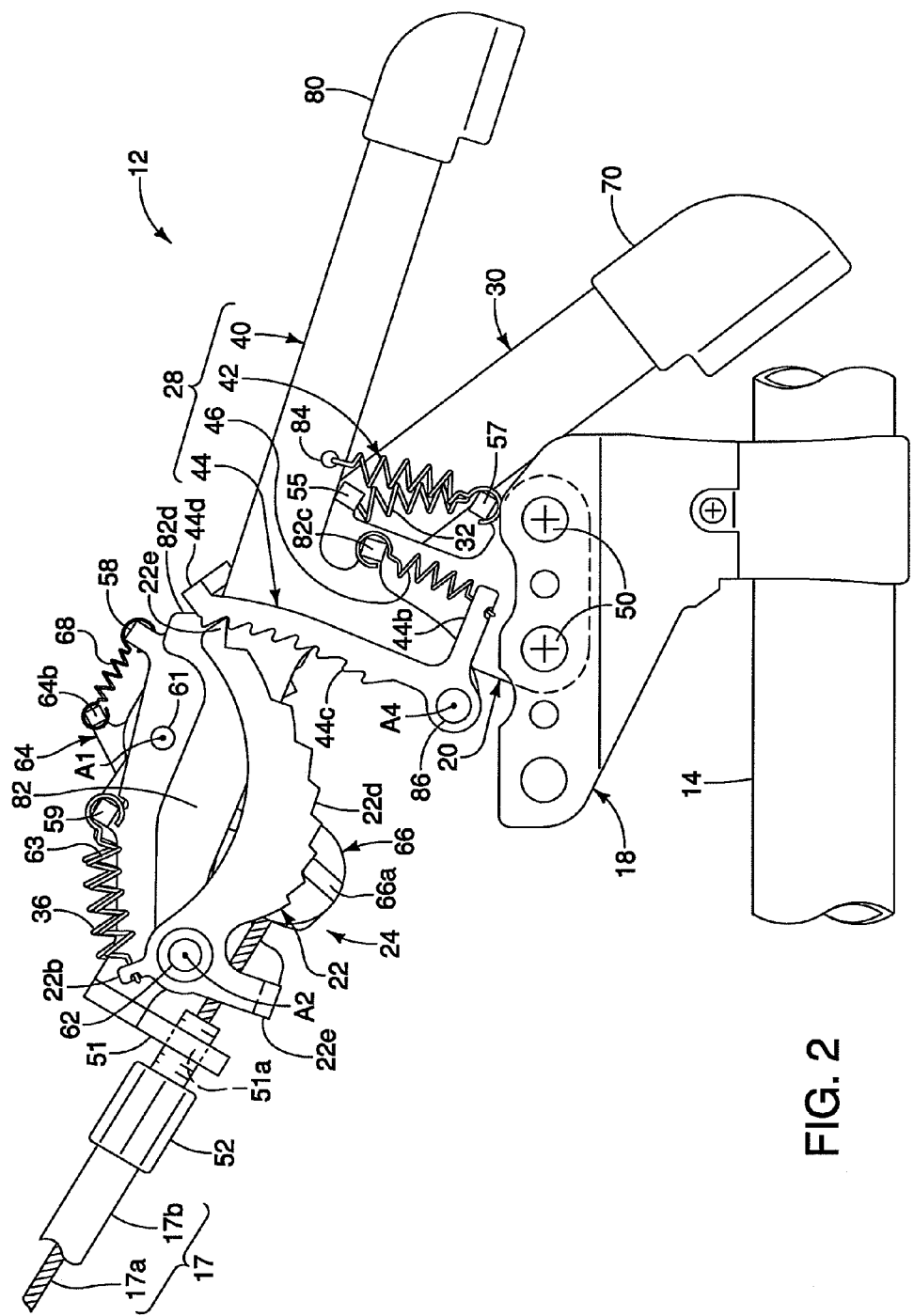
FIG. 2 is a top plan view of the cable operating mechanism in accordance with the illustrated embodiment, with the operating levers in their rest positions.
Figure 3:
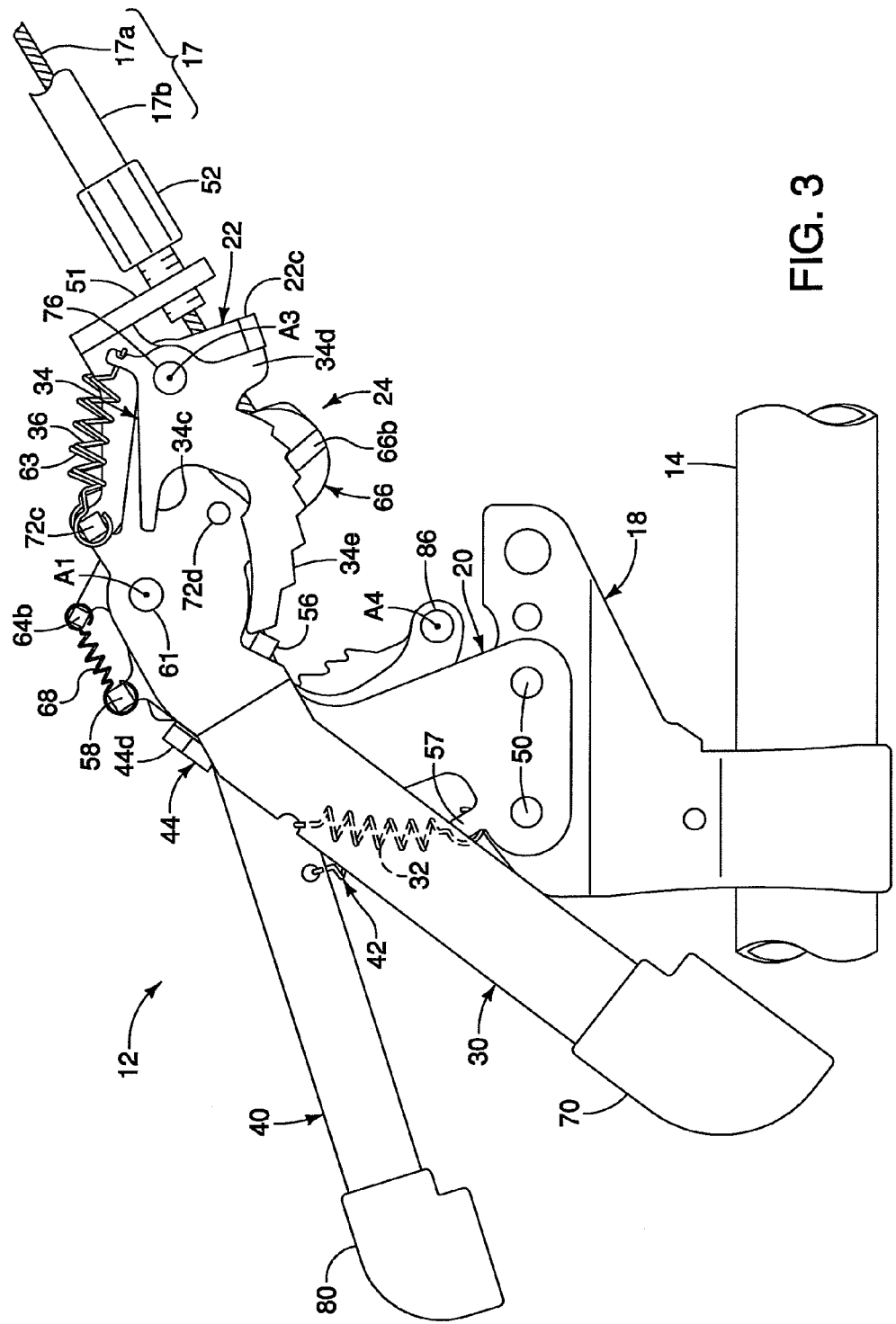
FIG. 3 is a bottom plan view of the cable operating mechanism illustrated in FIG. 2, with the operating lever in their rest positions.
Figure 4:
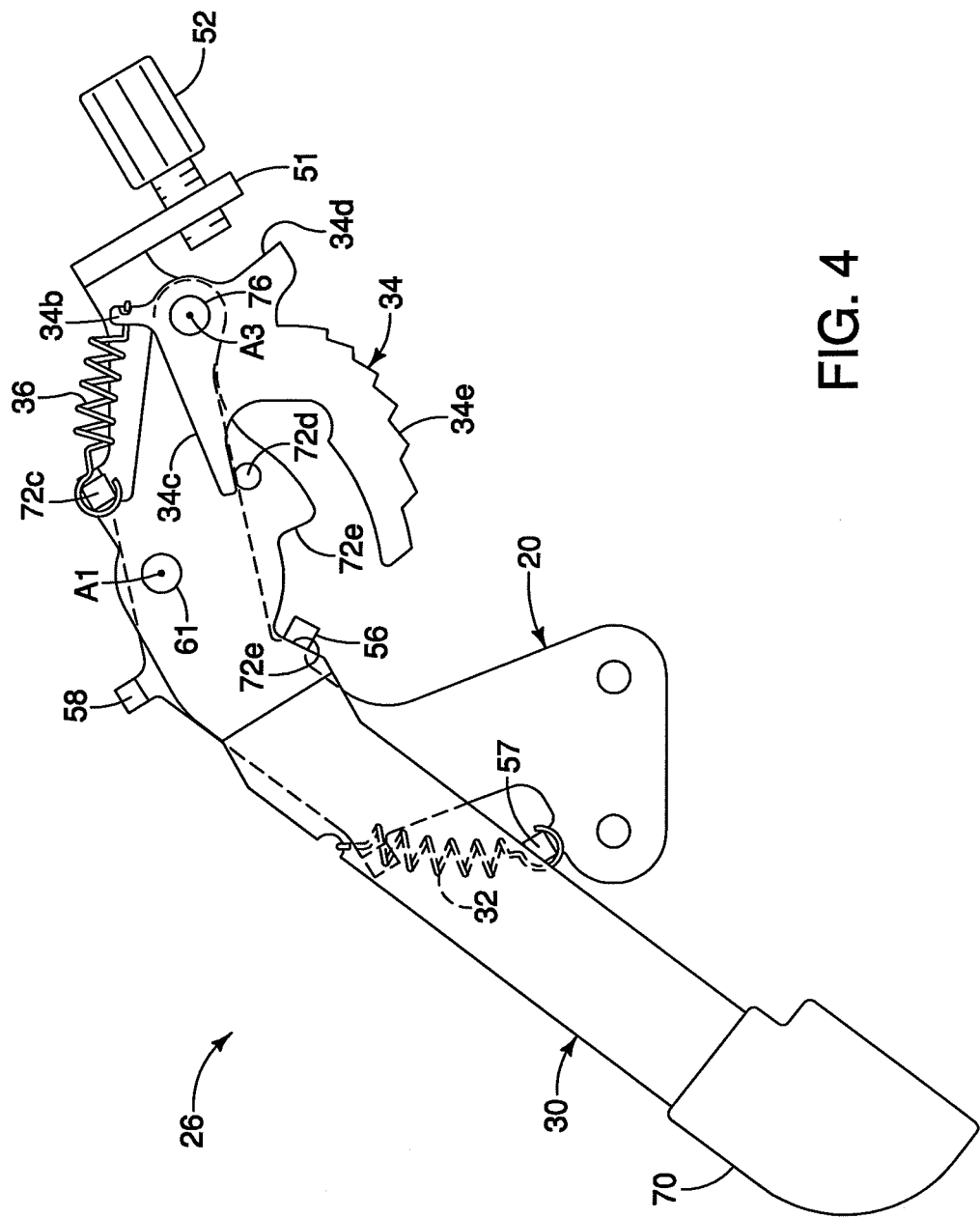
FIG. 4 is a bottom plan view of the fixed member with the wire pulling mechanism attached to the fixed member and the pull operating lever in the rest position.
Figure 5:
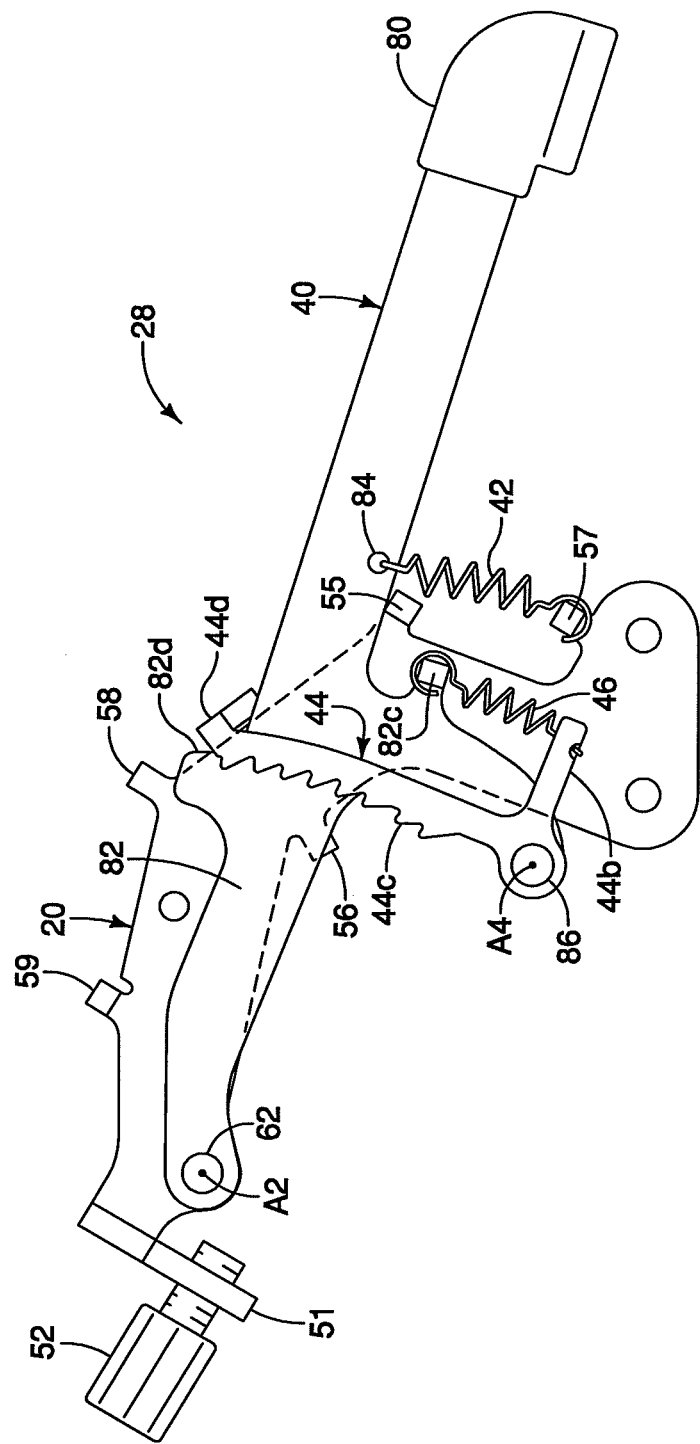
FIG. 5 is a top plan view of the fixed member with the wire releasing mechanism attached to the fixed member and the release operating lever in the rest position.
Figure 6:
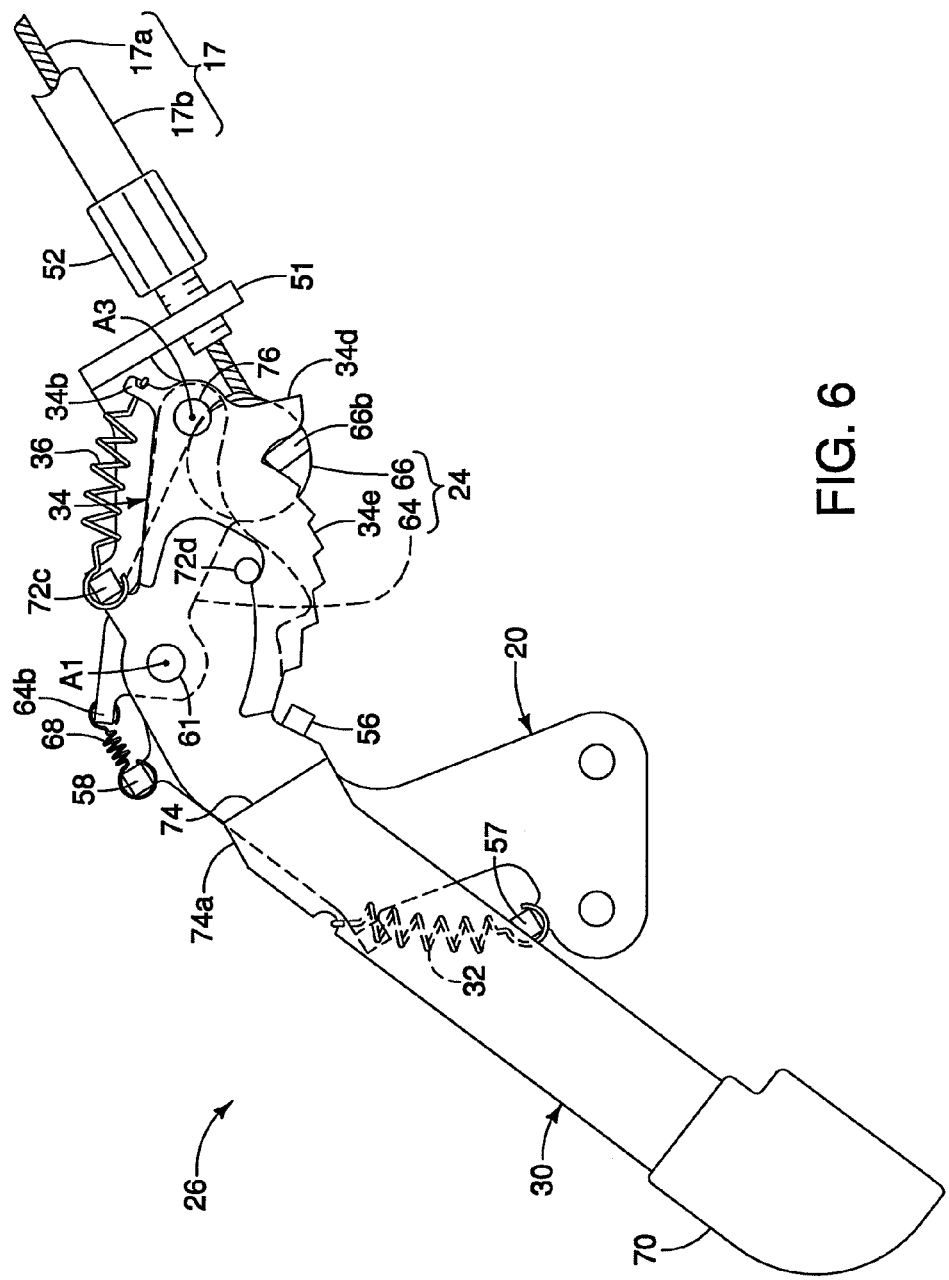
FIG. 6 is a bottom plan view of the fixed member with the wire pulling mechanism and the wire takeup member attached to the fixed member and the pull operating lever in the rest position.
Figure 7:
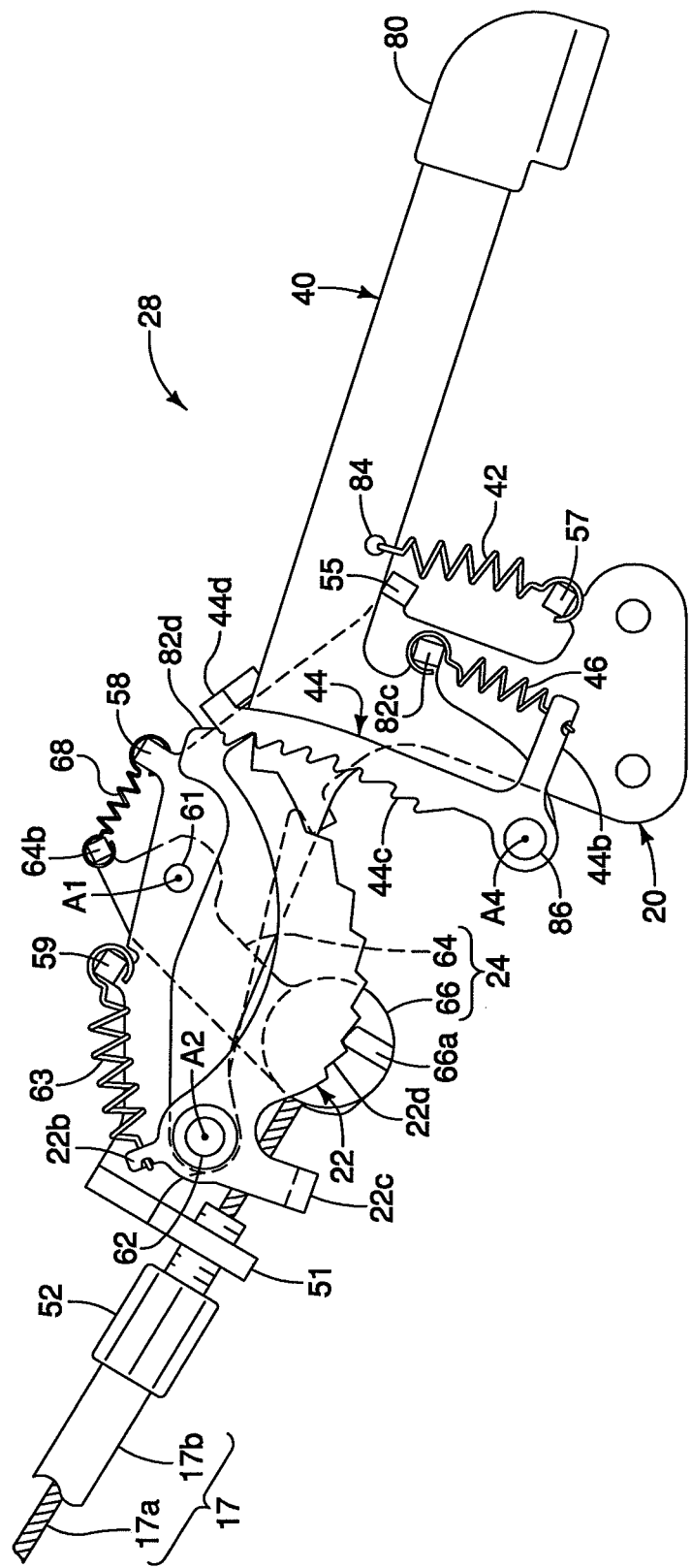
FIG. 7 is a top plan view of the fixed member with the wire releasing mechanism and the wire takeup member attached to the fixed member and the release operating lever in the rest position.

As seen in FIGS. 2 and 3, the bicycle cable operating mechanism 12 basically includes a clamping member 18, a fixed member 20, a wire positioning member 22, a wire takeup member 24, a wire pulling mechanism 26 (see, FIG. 4) and a wire releasing mechanism 28 (see, FIG. 2). The wire pulling mechanism 26 is configured to pull the inner wire 17*a* with respect to the fixed member 20, while the wire releasing mechanism 28 is configured to release the inner wire 17*a* with respect to the fixed member 20. As best seen in FIG. 4, the wire pulling mechanism 26 basically includes a pull operating lever 30, a primary biasing element 32, a wire pulling member 34 and a secondary biasing element 36. As best seen in FIG. 5, the wire releasing mechanism 28 basically includes a release operating lever 40, a primary biasing element 42, a wire releasing member 44 and a secondary biasing element 46. As discussed below, the positioning member 22 and the wire releasing member 44 are arranged to move with respect to each other such that a single progressive movement of the wire releasing member 44 during the wire releasing operation of the wire releasing member 44 from a rest position to an operated (wire releasing) position selectively releases the wire takeup member 24 with respect to the fixed member 20 for movement through at least two predetermined wire (shift) positions, if desired.

The clamping member 18 is preferably a hard rigid member formed of a suitable rigid material such as a metal plate material. The clamping member 18 is basically a band clamp that clamps onto the handlebar 14 in a conventional manner.

Figure 24:
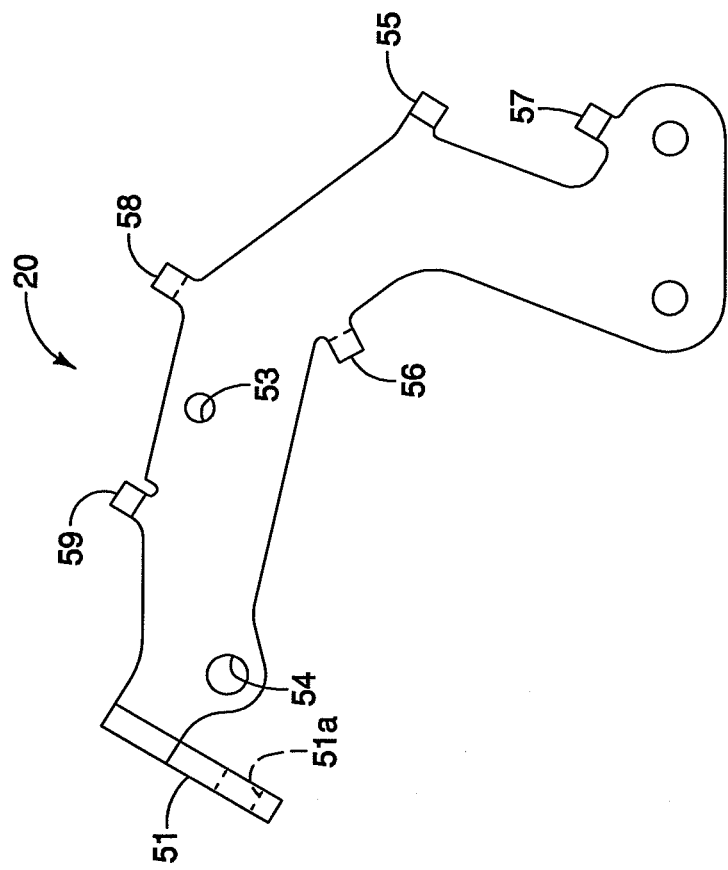
FIG. 24 is a top plan view of the fixed member of the cable operating mechanism.
Figure 29:
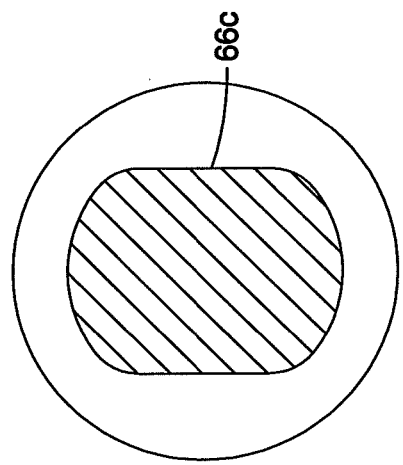
FIG. 29 is a cross sectional view of the attachment part of the wire takeup member as seen along section line 29-29 of FIG. 28.
Figure 27:
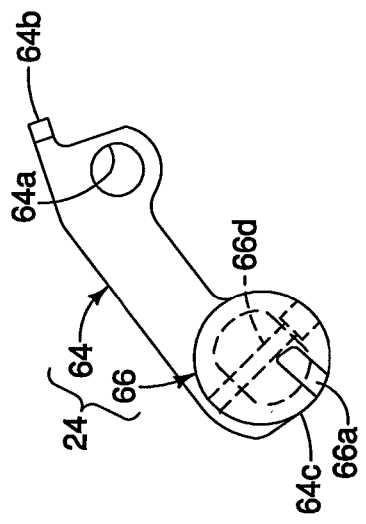
FIG. 27 is a top plan view of the wire takeup member of the cable operating mechanism.
Figure 28:
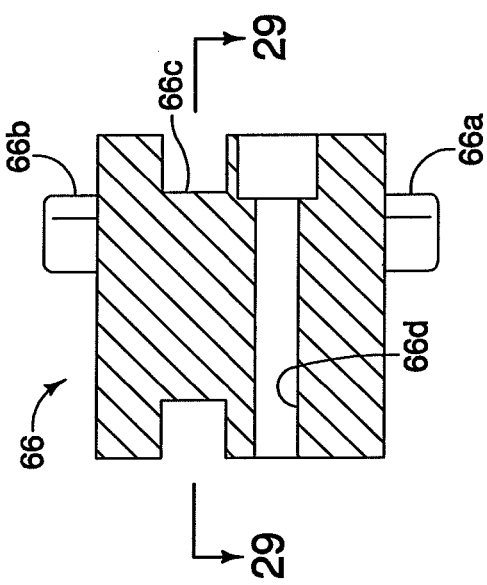
FIG. 28 is a cross sectional view of the attachment part of the wire takeup member as seen along section line 28-28 of FIG. 26.
Figure 26:
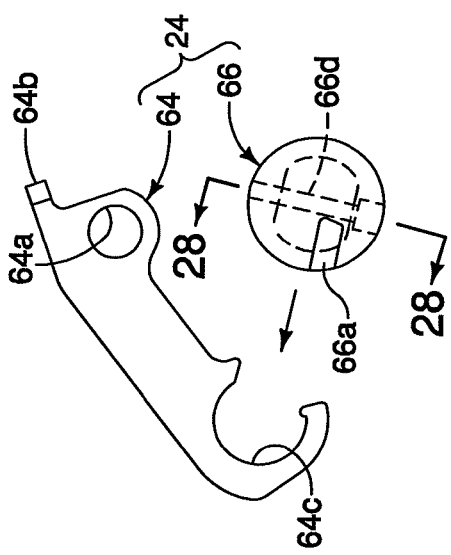
FIG. 26 is a top exploded plan view of the wire takeup member of the cable operating mechanism.

As seen in FIGS. 2, 3 and 24, the fixed member 20 is preferably a hard rigid member formed of a suitable rigid material such as a metal plate material. The fixed member 20 is fixedly coupled to the clamping member 18 by a pair of fasteners 50 as seen in FIGS. 2 and 3. The fixed member 20 supports the wire positioning member 22, the wire takeup member 24, the wire releasing mechanism 28 and the wire pulling mechanism 26. Also one end of the outer casing 17b of the shift operating cable 17 is fixed with respect to the fixed member 20. In particular, the fixed member 20 has a cable attachment flange 51 with a threaded hole 51a that receives a cable adjustment bolt 52. The adjustment bolt 52 is a conventional member that contacts the outer casing 17b and has a bore in which the inner wire 17a passes through such that the inner wire 17a is fixed to the wire takeup member 24.

Figure 8:
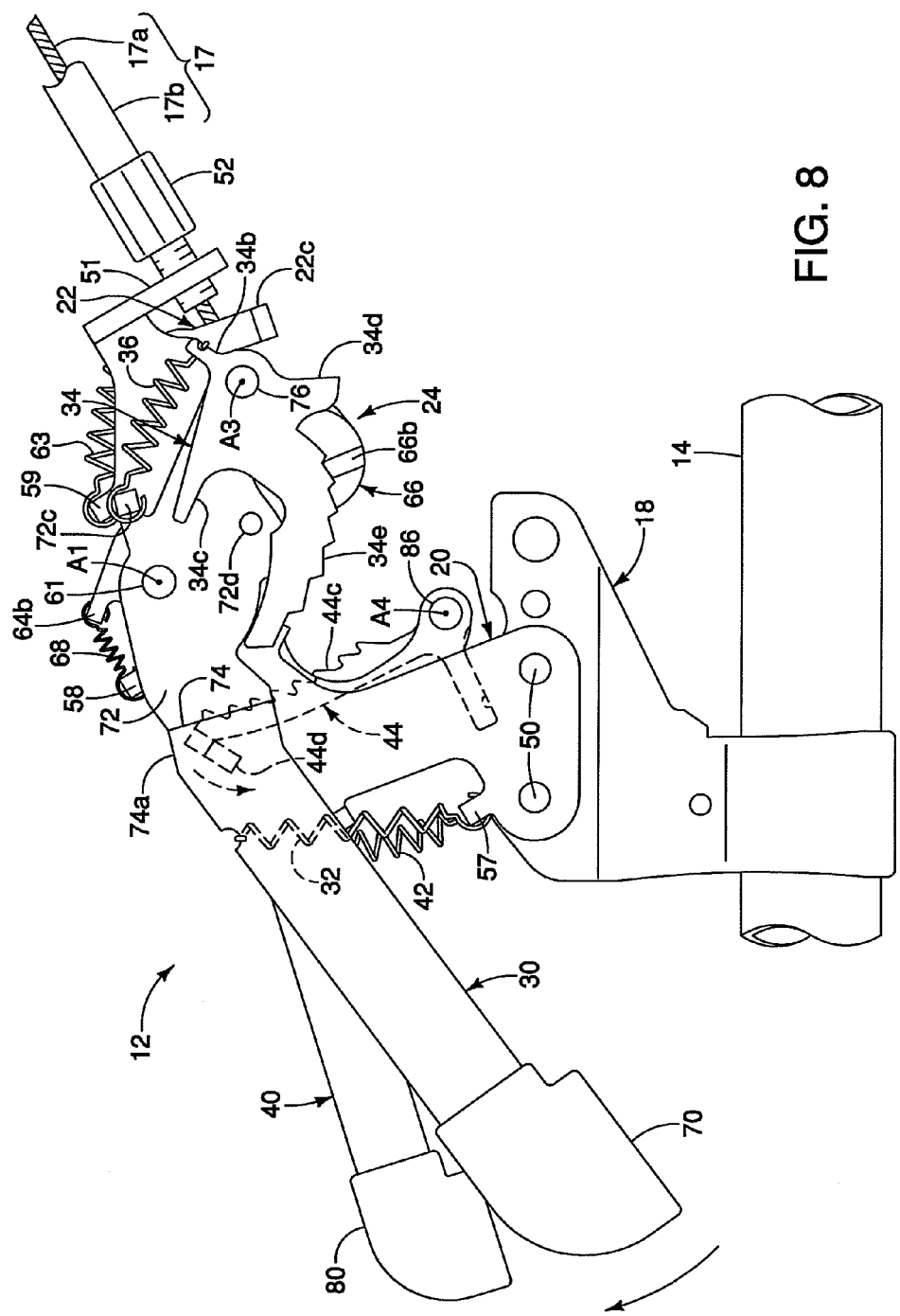
FIG. 8 is a bottom plan view of the cable operating mechanism with the pull operating lever in the operated (wire pulling) position.
Figure 9:
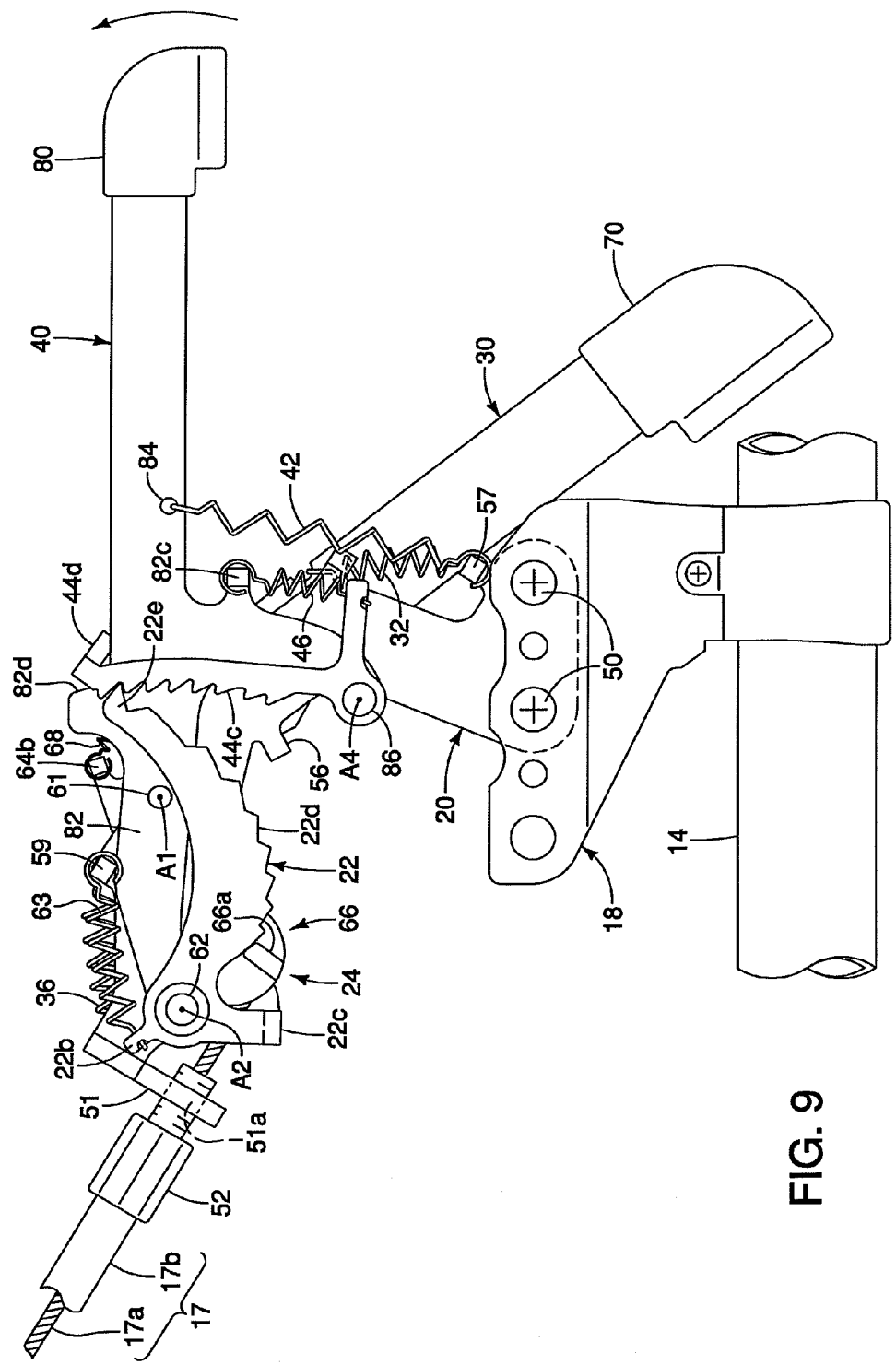
FIG. 9 is a top plan view of the fixed member with the wire releasing mechanism and the wire takeup member attached to the fixed member and the release operating lever in the rest position.
Figure 10:
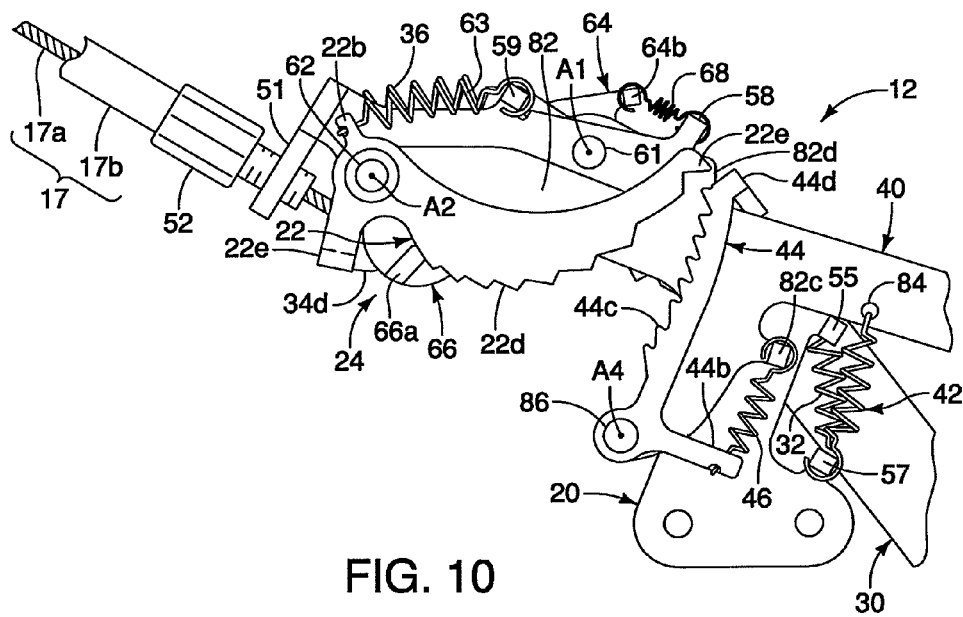
FIG. 10 is a partial top plan view of the cable operating mechanism in the fully released position, which is the first shift (wire) position that corresponds to the ninth gear position of the rear derailleur.
Figure 11:
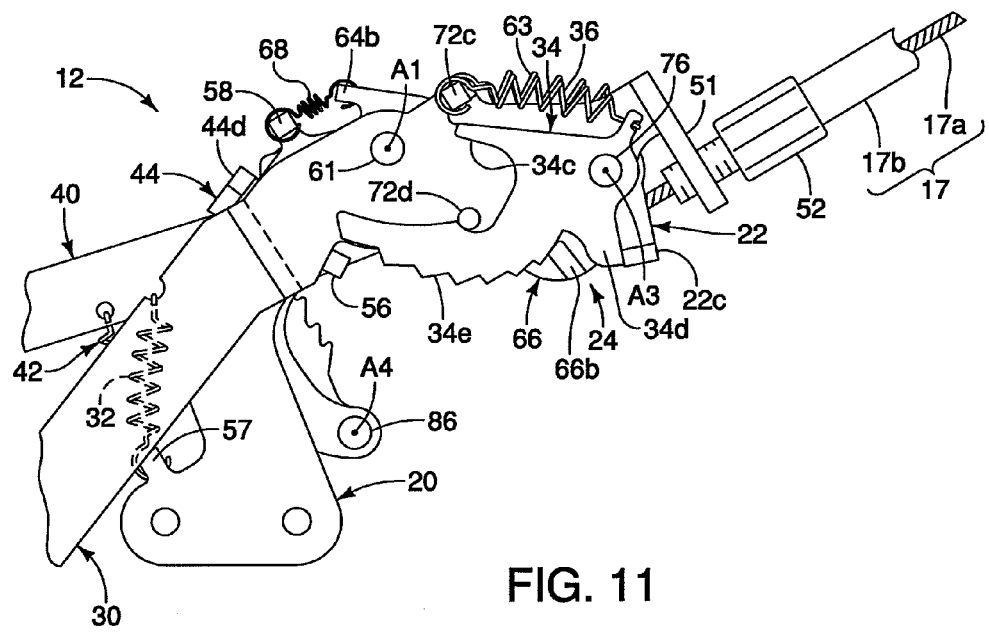
FIG. 11 is a partial bottom plan view of the cable operating mechanism in the fully released position, which is the first shift (wire) position that corresponds to the ninth gear position of the rear derailleur.

As seen in FIG. 24, the fixed member 20 further includes a first pivot hole 53, a second pivot hole 54, a release operating lever stop 55, a pull operating lever stop 56 and a plurality of spring mounting tabs 57 to 59. The first pivot hole 53 pivotally supports the pull operating lever 30 and the wire takeup member 24 about a first pivot axis A1 as seen in FIG. 8. In particular, the first pivot hole 53 receives a pivot pin 61 that forms the first pivot axis A1. On the other hand, the second pivot hole 54 pivotally supports the release operating lever 40 and the wire positioning member 22 about a second pivot axis A2 as seen in FIG. 9. In particular, the second pivot hole 54 receives a pivot pin 62 that forms the second pivot axis A2.

The primary biasing element 32 of the wire pulling mechanism 26 is a coil tension spring that has one end attached to the spring mounting tab 57 and a second end attached to the pull operating lever 30. The primary biasing element 32 applies a biasing force to the pull operating lever 30 for urging the pull operating lever 30 about the first pivot axis A1 so as to rest against the pull operating lever stop 56. Thus, in a top plan view as seen in FIGS. 2, 5, 7 and 9, the pull operating lever 30 is biased in the clockwise direction about the first pivot axis A1 by the primary biasing element 32.

The primary biasing element 42 of the wire releasing mechanism 28 is a coil tension spring that has one end attached to the spring mounting tab 57 and a second end attached to the release operating lever 40. The primary biasing element 42 applies a biasing force to the release operating lever 40 for urging the release operating lever 40 about the second pivot axis A2 so as to rest against the release operating lever stop 55. Thus, in a top plan view as seen in as seen in FIGS. 2, 5, 7 and 9, the release operating lever 40 is biased in the clockwise direction about the second pivot axis A2 by the primary biasing element 42.

Figure 25:
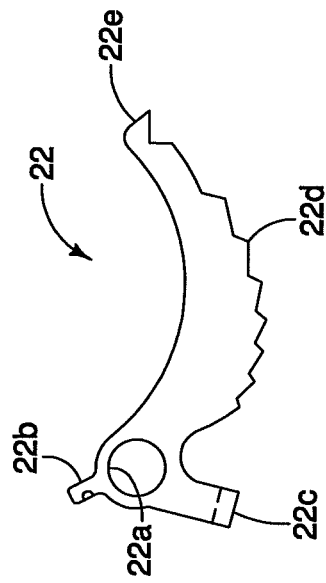
FIG. 25 is a top plan view of the wire positioning member of the cable operating mechanism.

As seen in FIG. 25, the wire positioning member 22 is preferably a hard rigid member formed of a suitable rigid material such as a metal plate material. The wire positioning member 22 is pivotally mounted to the fixed member 20 by the pivot pin 62 as seen in FIG. 2. Thus, the wire positioning member 22 is pivotally mounted with respect to the fixed member 20 about the second pivot axis A2 that is different and offset from the first pivot axis A1 of the wire takeup member 24. The wire positioning member 22 includes a pivot hole 22a, a spring mounting tab 22b, a contact extension 22c, a plurality of positioning teeth or abutments 22d and a driven tooth 22e. The pivot pin 62 is disposed in the pivot hole 22a of the wire positioning member 22 to pivotally support the wire positioning member 22 on the fixed member 20.

A biasing element 63 is attached to the spring mounting tab 22b to apply a biasing force to the wire positioning member 22 for urging the wire positioning member 22 about the second pivot axis A2 so as to rest against the wire takeup member 24. Thus, in a top plan view as seen in as seen in FIGS. 2, 5, 7 and 9, the wire positioning member 22 is biased in the clockwise direction about the second pivot axis A2 by the biasing element 63. Preferably, the biasing element 63 is a coil tension spring that has one end attached to the spring mounting tab 22b and a second end attached to the spring mounting tab 59 of the fixed member 20.

The contact extension 22c of the wire positioning member 22 extends perpendicularly from the rest of the wire positioning member 22. The contact extension 22c of the wire positioning member 22 is configured and arranged to be selectively contacted by the wire pulling member 34 so as to rotate the wire pulling member 34 during a wire releasing operation of the release operating lever 40 as discussed below.

The positioning abutments 22d of the wire positioning member 22 are configured to engage the wire takeup member 24 to maintain the wire takeup member 24 in one of a plurality of predetermined wire positions. In other words, each of the positioning abutments 22d corresponds to one of the predetermined wire positions. In the case of a shifter, the predetermined wire positions correspond to predetermined shift positions. In the illustrated embodiment, the wire positioning member 22 has eight positioning abutments 22d that correspond to eight of the nine predetermined shift (wire) positions of the rear derailleur 16. In the first shift (wire) position, the wire takeup member 24 does not engage one of the positioning abutments 22d, since the first shift (wire) position is the fully released position. The positioning abutments 22d are arranged along an arc in a ratchet type (stair-like) configuration such that the positioning abutments 22d progressively move out of the path of the wire takeup member 24 during a wire releasing operation. As seen in FIG. 2, the leftmost one of the positioning abutments 22d is disposed closest to the second pivot axis A2 as measured in a radial direction from the second pivot axis A2. This leftmost one of the positioning abutments 22d is disposed at a first radial distance (height) as measured from the second pivot axis A2 to a radially outermost point on that positioning abutment 22d. Each consecutive positioning abutment 22d increases in radial distance (height) from the second pivot axis A2 to define a stair configuration. In other words, each of the positioning abutments 22d has a respective radial distance from the second pivot axis A2, with respect to the second pivot axis A2, the respective radial distances of the positioning abutments 22d all being different from each other. For example the positioning abutment 22d that is located beside the driven tooth 22e would have the greatest radial distance (height) from the second pivot axis A2 (which represents the "base" of the stair configuration of the positioning abutments 22d).

Figure 12:
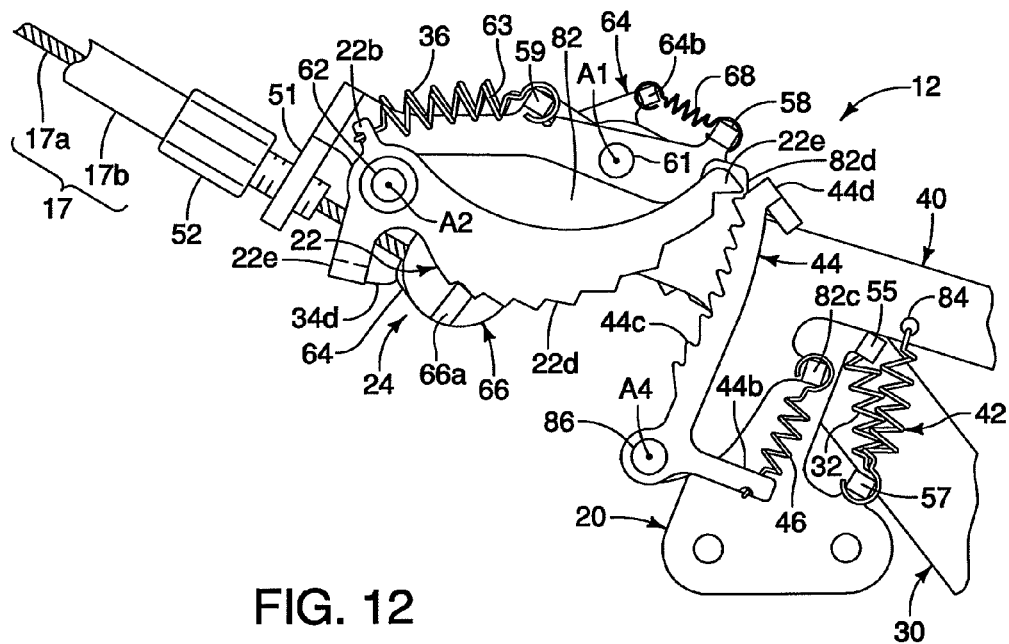
FIG. 12 is a partial top plan view of the cable operating mechanism in the second shift (wire) position, which corresponds to the eighth gear position of the rear derailleur.
Figure 13:
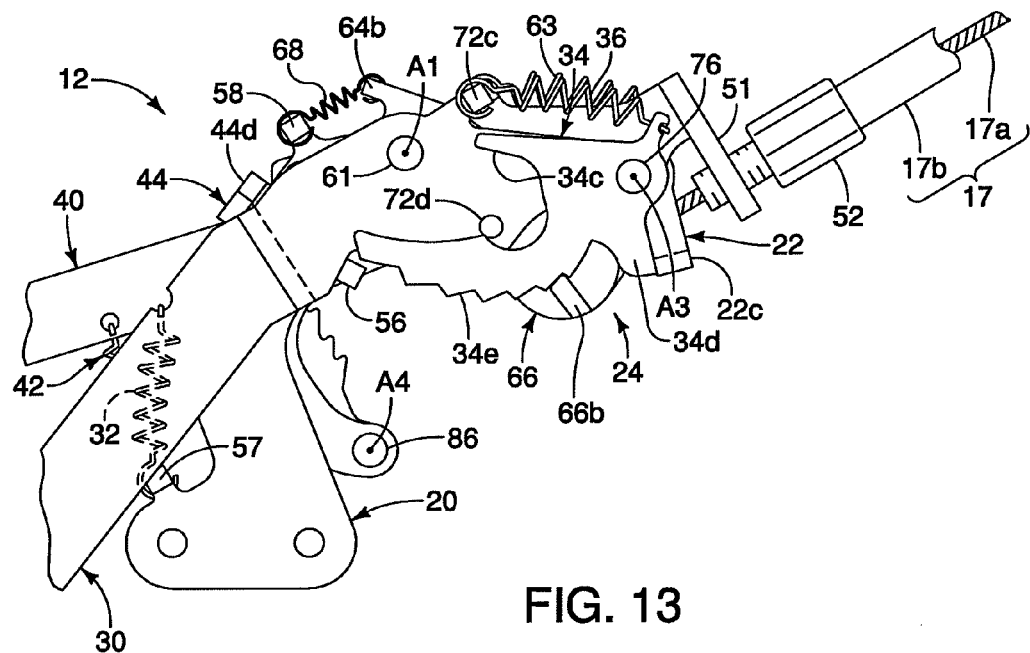
FIG. 13 is a partial bottom plan view of the cable operating mechanism in the second shift (wire) position, which corresponds to the eighth gear position of the rear derailleur.
Figure 14:
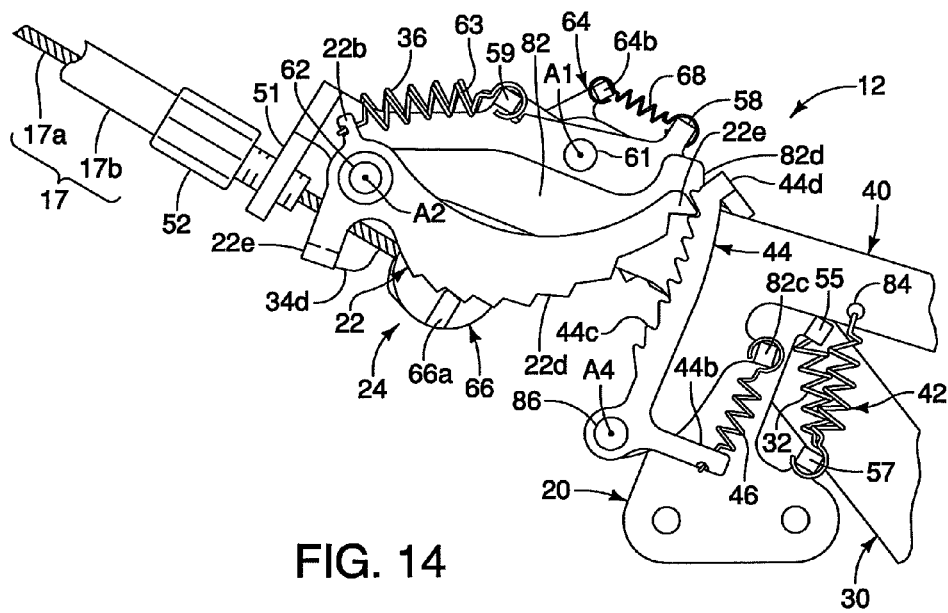
FIG. 14 is a partial top plan view of the cable operating mechanism in the third shift (wire) position, which corresponds to the seventh gear position of the rear derailleur.
Figure 15:
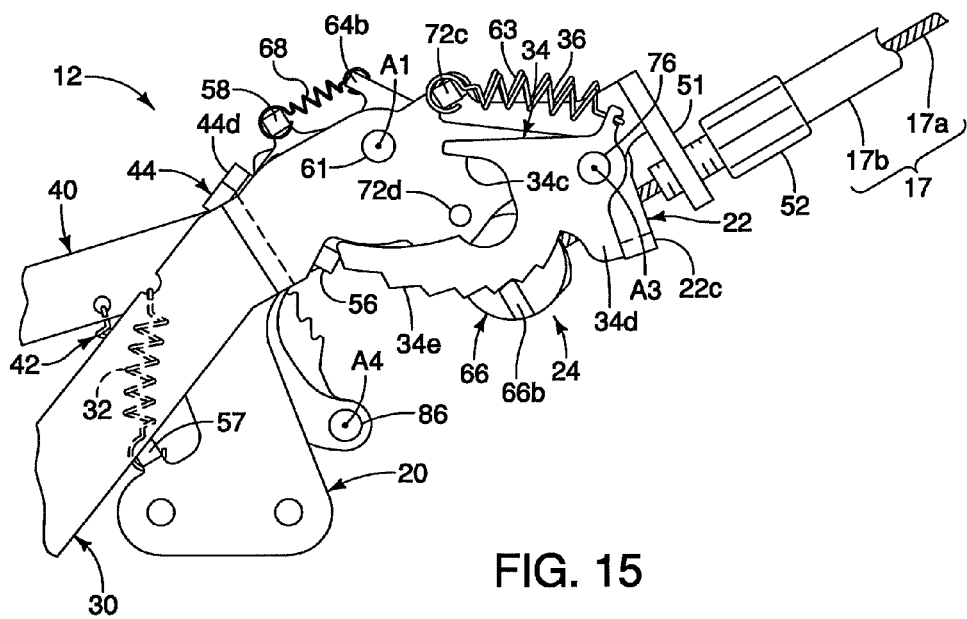
FIG. 15 is a partial bottom plan view of the cable operating mechanism in the third shift (wire) position, which corresponds to the seventh gear position of the rear derailleur.

The driven tooth 22e of the wire positioning member 22 is configured and arranged to engage the wire releasing member 44 in the third through ninth shift (wire) positions. In the second shift (wire) position (FIGS. 12 and 13), the driven tooth 22e of the wire positioning member 22 is spaced from the wire releasing member 44 in the rest position. However, when the release operating lever 40 is moved from the rest position to the operated position, the release operating lever 40 engages the driven tooth 22e of the wire positioning member 22 to rotate the wire positioning member 22 against the biasing force of the biasing element 63 to release the wire takeup member 24 from one of the positioning abutments 22d. The driven tooth 22e of the wire positioning member 22 is engaged with the wire releasing member 44 in the rest position when the wire releasing member 44 is in the third through ninth shift (wire) positions. Thus, when the wire releasing member 44 is in the third through ninth shift (wire) positions, the driven tooth 22e of the wire positioning member 22 will rotate the wire positioning member 22 against the biasing force of the biasing element 63 to release the wire takeup member 24 from one of the positioning abutments 22d. This arrangement also provides for a multiple release action so that two or more shift (wire) positions can occur in a single progressive movement of the release operating lever 40 from the rest position to the operated position. In other words, as seen for example between FIGS. 14 and 16, upon a single progressive movement of the release operating lever 40, a currently engaged one of the positioning abutments 22d is released from the wire takeup member 44, and another non-adjacent one of the positioning abutments 22d engages the wire takeup member 44. In this way, multiple shifts can occur in a single progressive movement of the release operating lever 40.

As seen in FIGS. 26 to 29, the wire takeup member 24 is pivotally mounted to the fixed member 20 by the pivot pin 61. Thus, the wire takeup member 24 is pivotally mounted with respect to the fixed member 20 about the first pivot axis A1 that is different and offset from the second pivot axis A2 of the wire positioning member 22. The wire takeup member 24 includes a lever part 64 and an attachment part 66. The attachment part 66 is attached to the lever part 64 so that they move together as a unit about the first pivot axis A1. In other words, there is no relative movement between the attachment part 66 and the lever part 64 during movement about the first pivot axis A1 throughout the wire pulling operation and throughout the wire releasing operation.

The lever part 64 is preferably a hard rigid member formed of a suitable rigid material such as a metal plate material. The lever part 64 includes a pivot hole 64a, a spring mounting tab 64b and a mounting opening 64c. The pivot pin 61 is disposed in the pivot hole 64a of the lever part 64 to pivotally support the lever part 64 on the fixed member 20.

A biasing element 68 is attached to the spring mounting tab 64b to apply a biasing force to the lever part 64 of the wire takeup member 24 for urging the wire takeup member 24 about the first pivot axis A1 such that the attachment part 66 of the wire takeup member 24 is urged against the wire positioning member 22 and the wire pulling member 34. Thus, in a top plan view as seen in as seen in FIGS. 2, 5, 7 and 9, the wire takeup member 24 is biased in the clockwise direction about the first pivot axis A1 by the biasing element 68. Preferably, the biasing element 68 is a coil tension spring that has one end attached to the spring mounting tab 64b and a second end attached to the spring mounting tab 58 of the fixed member 20.

The attachment part 66 is a metal barrel shaped member that is preferably a hard rigid member formed of a suitable rigid material such as a cast metal material. The attachment part 66 has a single position maintaining abutment 66a on one axial end for engaging the positioning abutments 22d of the wire positioning member 22, and a single driven abutment 66b on the other axial end for engaging the wire pulling member 34 as discussed below. The positioning abutments 22d of the wire positioning member 22 are configured and arranged to selectively and individually contact the single position maintaining abutment 66a so as to maintain the wire takeup member 24 in one of the wire (shift) positions. The wire pulling member 34 is configured and arranged to contact the single driven abutment 66b so as to move the wire takeup member 24 as discussed below.

The attachment part 66 also has a reduced area 66c forming a groove 66c between the axial ends of the attachment part 66. This reduced area groove 66c is receiving the mounting opening 64c in the lever part 64 of the wire takeup member 24. The reduced area 66c has a first transverse width that allows the reduced area of the attachment part 66 to be inserted into the mounting opening 64c in the lever part 64 when in a first orientation, and a second transverse width that prevents removal of the attachment part 66 from the mounting opening 64c in the lever part 64 when in a second orientation (i.e., the normal in use position). The attachment part 66 also has a bore 66d for attaching the inner wire 17a.

Figure 30:
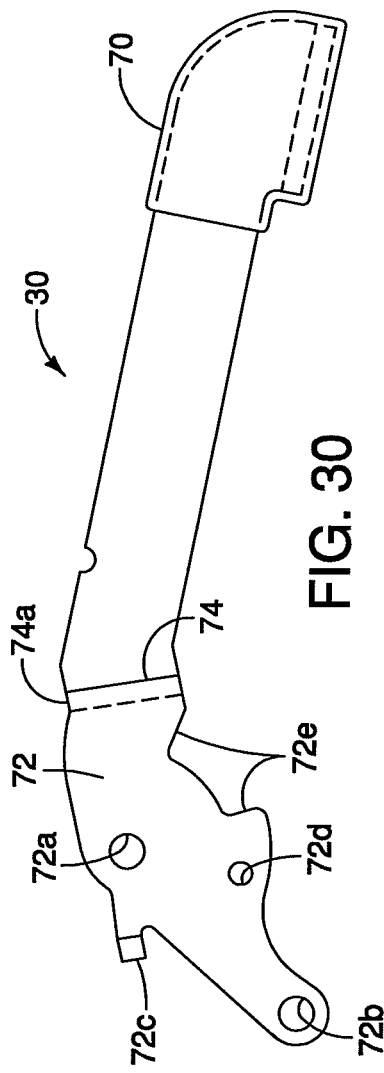
FIG. 30 is a top plan view of the pull operating lever of the cable operating mechanism.

As seen in FIGS. 2, 3 and 30, the pull operating lever 30 is preferably a hard rigid member formed of a suitable rigid material such as a metal plate material. The pull operating lever 30 is pivotally mounted to the fixed member 20 by the pivot pin 61 so as to pivot about the first pivot axis A1. The pull operating lever 30 is a trigger type lever that returns to the rest position after being moved from the rest position to an operated (wire pulling) position. The primary biasing element 32 applies a biasing force to the pull operating lever 30 for urging the pull operating lever 30 about the first pivot axis A1 so as to rest against the pull operating lever stop 56. Thus, in a top plan view as seen in as seen in FIGS. 2, 5, 7 and 9, the pull operating lever 30 is biased in the clockwise direction about the first pivot axis A1 by the primary biasing element 32.

As seen in FIG. 30, the pull operating lever 30 basically includes a user operating portion 70, a mounting portion 72 and a lateral portion 74 connecting the user operating portion 70 to the mounting portion 72 so that the user operating portion 70 and the mounting portion 72 lie in different planes.

The mounting portion 72 of the pull operating lever 30 includes a main pivot hole 72a, a secondary pivot hole 72b, a spring mounting tab 72c, a stopper 72d and a pair of stop surfaces 72e. The main pivot hole 72a receives the pivot pin 61 to pivotally mount the pull operating lever 30 to the fixed member 20 about the first pivot axis A1 from the rest position to the operated (wire pulling) position. The secondary pivot hole 72b receives a pivot pin 76 that pivotally supports the wire pulling member 34 about a third pivot axis A3. When the pull operating lever 30 is in the rest position, the second and third pivot axes A2 and A3 are aligned or substantially aligned. When the pull operating lever 30 is moved from the rest position to the operated (wire pulling) position, the wire pulling member 34 moves with the pull operating lever 30.

Figure 16:
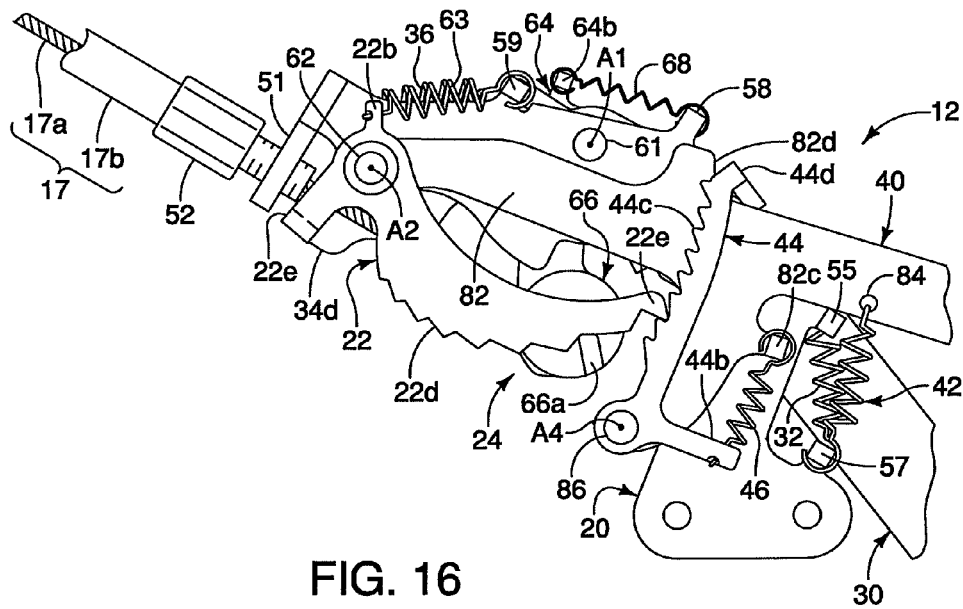
FIG. 16 is a partial top plan view of the cable operating mechanism in the eighth shift (wire) position, which corresponds to the second gear position of the rear derailleur.
Figure 17:
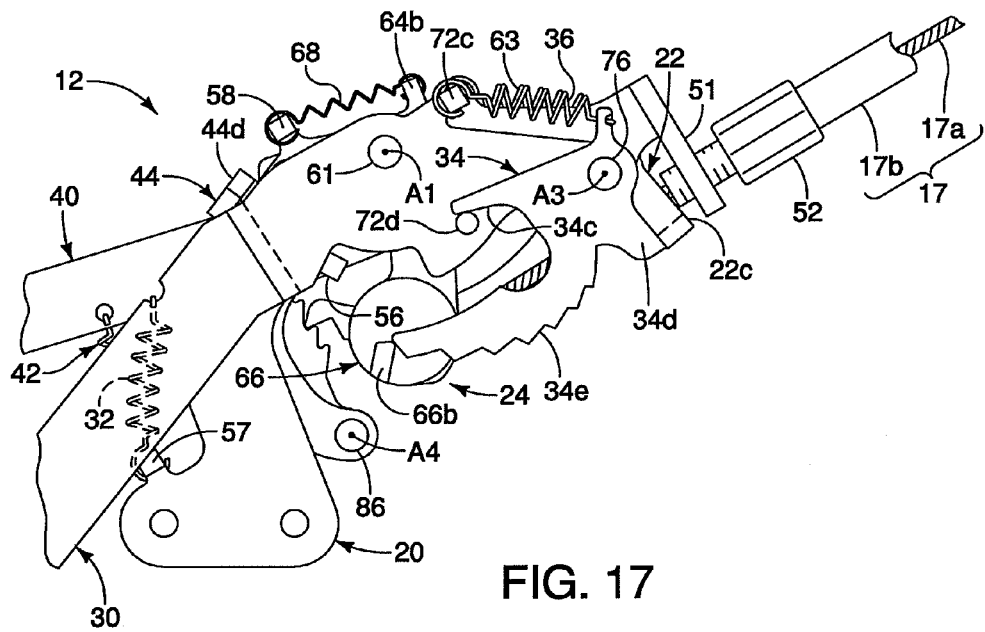
FIG. 17 is a partial bottom plan view of the cable operating mechanism in the eighth shift (wire) position, which corresponds to the second gear position of the rear derailleur.
Figure 18:
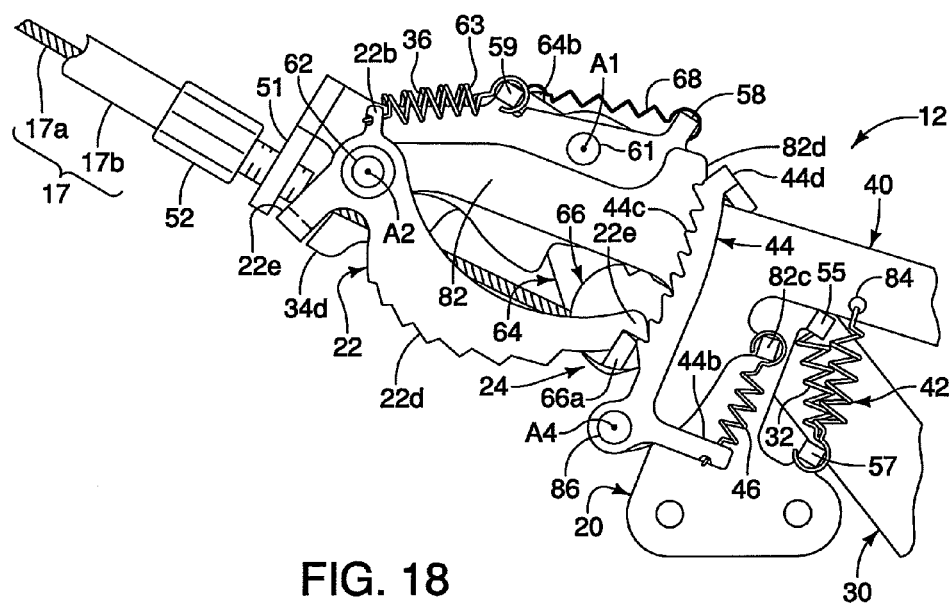
FIG. 18 is a partial top plan view of the cable operating mechanism in the ninth shift (wire) position, which corresponds to the first gear position of the rear derailleur.
Figure 19:
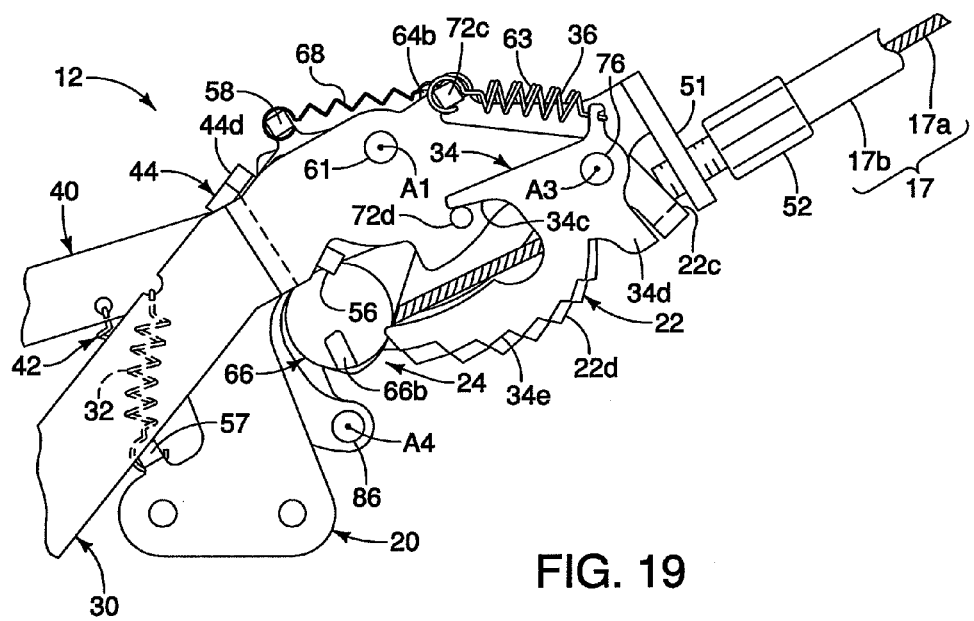
FIG. 19 is a partial bottom plan view of the cable operating mechanism in the ninth shift (wire) position, which corresponds to the first gear position of the rear derailleur.
Figure 20:
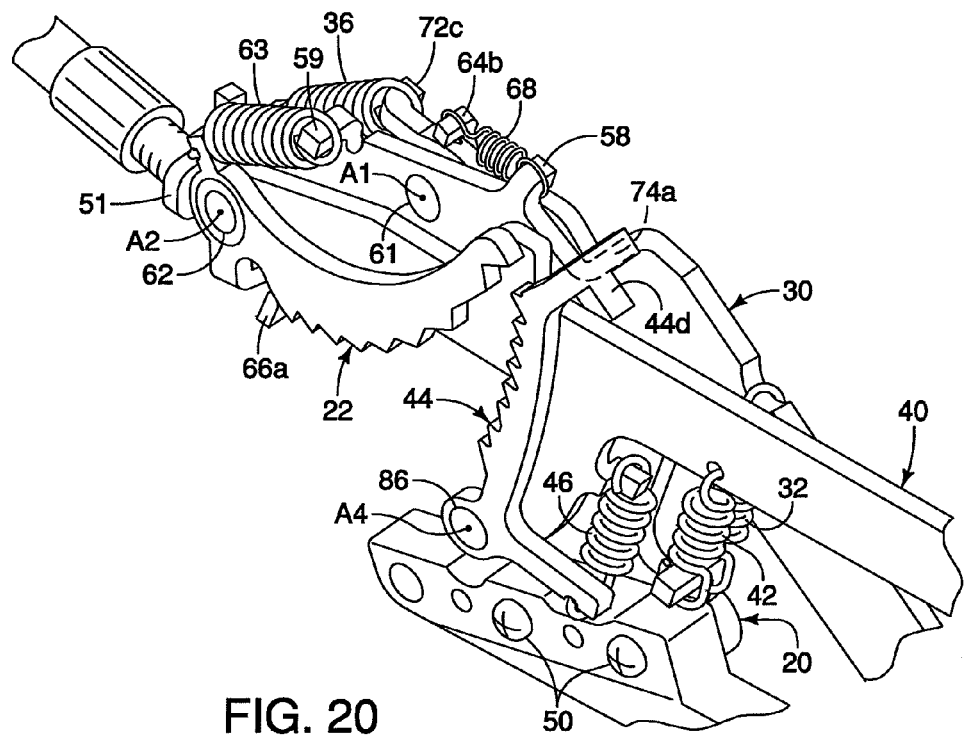
FIG. 20 is a partial front perspective view of the cable operating mechanism.
Figure 21:
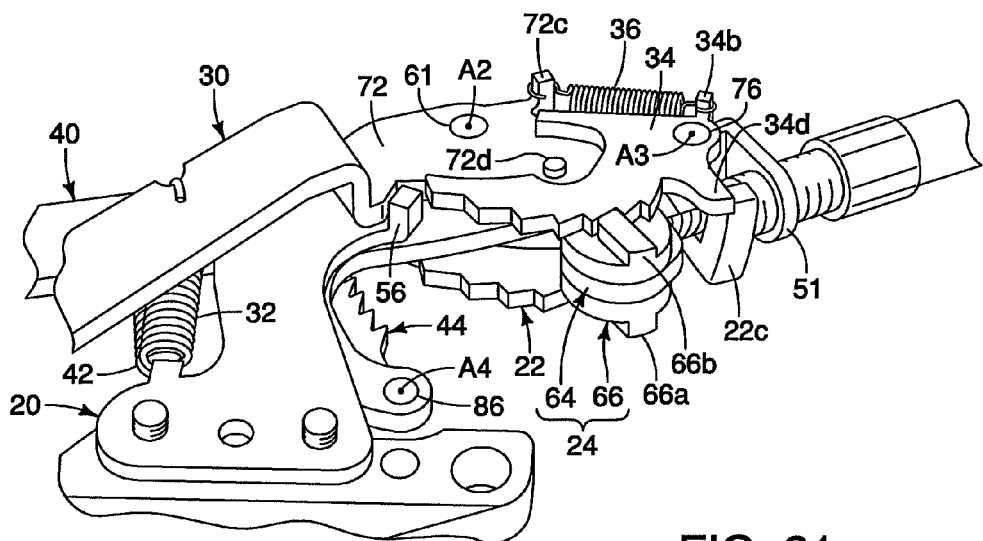
FIG. 21 is a partial rear perspective view of the cable operating mechanism.
Figure 23:
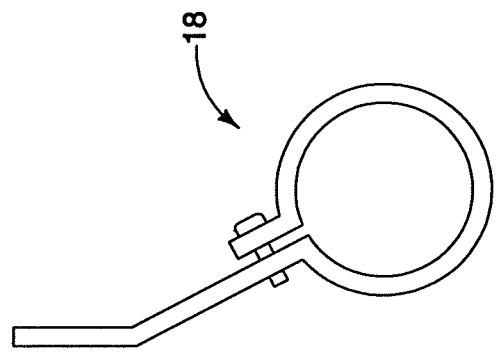
FIG. 23 is a side elevational view of the clamp member of the cable operating mechanism.
Figure 22:
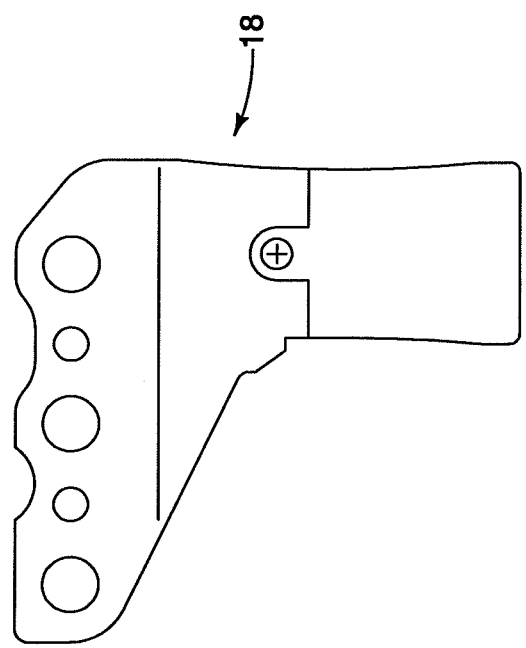
FIG. 22 is a top plan view of the clamp member of the cable operating mechanism.

The secondary biasing element 36 of the wire pulling mechanism 26 has a first end attached to the wire pulling member 34 and a second end attached to the spring mounting tab 72c of the pull operating lever 30. Preferably, the secondary biasing element 36 of the wire pulling mechanism 26 is a coil tension spring. The secondary biasing element 36 applies a biasing force to the wire pulling member 34 for urging the wire pulling member 34 about the third pivot axis A3 such that the wire pulling member 34 is urged against the single driven abutment 66b on the attachment part 66 of the wire takeup member 24 in all wire (shift) positions, except for the fully pulled position as seen in FIGS. 18 and 19 and in the wire (shift) position adjacent the fully pulled position as seen in FIGS. 16 and 17. Thus, in a bottom plan view as seen in FIG. 3, the wire pulling member 34 is biased in the counterclockwise direction about the third pivot axis A3 to maintain contact between the wire pulling member 34 and the single driven abutment 66*b* on the attachment part 66 of the wire takeup member 24, except for the fully pulled position as seen in FIGS. 18 and 19 and in the wire (shift) position adjacent the fully pulled position as seen in FIGS. 16 and 17.

The stopper 72*d* on the mounting portion 72 of the pull operating lever 30 is preferably a metal pin that projects from the bottom side of the mounting portion 72 of the pull operating lever 30. The stopper 72*d* contacts the wire pulling member 34 when the wire takeup member 24 is in the fully pulled position as seen in FIGS. 18 and 19 and in the wire (shift) position adjacent the fully pulled position as seen in FIGS. 16 and 17. In particular, the wire pulling member 34 is biased by the secondary biasing element 36 such that the wire pulling member 34 contacts the stopper 72*d* when the wire takeup member 24 is in the fully pulled position as seen in FIGS. 18 and 19 and in the wire (shift) position adjacent the fully pulled position as seen in FIGS. 16 and 17.

The stop surfaces 72*e* on the mounting portion 72 of the pull operating lever 30 control the range of pivotal movement of the pull operating lever 30 about the first pivot axis A1. In other words, the stop surfaces 72*e* define the rest position and the fully operated (wire pulling) position of the pull operating lever 30. In particular, one of the stop surfaces 72*e* contacts the pull operating lever stop 56 of the fixed member 20 in the rest position and the other of the stop surfaces 72*e* contacts the pull operating lever stop 56 of the fixed member 20 in the fully operated (wire pulling) position.

The lateral portion 74 also has an upper control (contact) surface 74*a* controls the movement of the release member 44 during a wire pulling operation of the pull operating lever 30. In particular, when the positioning member 22 moves from one wire (shift) position to the next adjacent wire (shift) position during a wire pulling operation of the pull operating lever 30, the tip or driven tooth 22*e* of the wire positioning member 22 must override one tooth of the release member 44. Thus, when the pull operating lever 30 is moved for moving the positioning member 22 from one wire (shift) position to the next adjacent wire (shift) position during a wire pulling operation of the pull operating lever 30, the upper control (contact) surface 74*a* will rotate the release member 44 slightly in a clockwise direction as viewed from a top plan view which is the direction away from the tip or driven tooth 22*e* of the wire positioning member 22 so that the tip or driven tooth 22*e* of the wire positioning member 22 can pass the one tooth of the release member 44.

Figure 31:
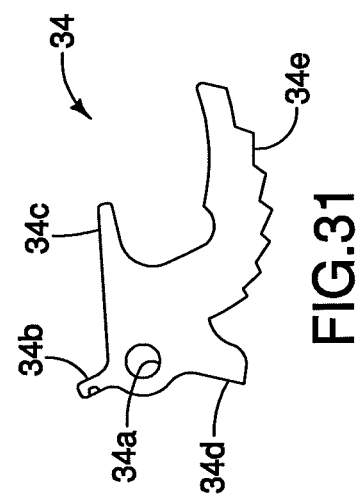
FIG. 31 is a top plan view of the wire pulling member of the cable operating mechanism.

As seen in FIG. 31, the wire pulling member 34 is preferably a hard rigid member formed of a suitable rigid material such as a metal plate material. As mentioned above, the wire pulling member 34 is pivotally mounted to the mounting portion 72 of the pull operating lever 30 by the pivot pin 76. Thus, the wire pulling member 34 is pivotally mounted with respect to the pull operating lever 30 about the third pivot axis A3. The wire pulling member 34 is preferably a flat plate that includes a pivot hole 34*a*, a spring mounting tab 34*b*, a stop portion 34*c*, a contact portion 34*d*, a plurality of drive teeth or abutments 34*e*. The pivot pin 76 is disposed in the pivot hole 34*a* of the wire pulling member 34 to pivotally support the wire pulling member 34 on the mounting portion 72 of the pull operating lever 30.

The secondary biasing element 36 of the wire pulling mechanism 26 has a first end attached to the spring mounting tab 34*b* of the wire pulling member 34 and a second end attached to the spring mounting tab 72*c* of the pull operating lever 30. Thus, the secondary biasing element 36 is attached to the spring mounting tab 22*b* to apply a biasing force to the wire pulling member 34 for urging the wire pulling member 34 about the third pivot axis A3, as mentioned above, such that one of the drive teeth or abutments 34*e* engages the single driven abutment 66*b* on the attachment part 66 of the wire takeup member 24.

The stop portion 34*c* of the wire pulling member 34 is configured and arranged to contact the stopper 72*d* on the mounting portion 72 of the pull operating lever 30 when the wire takeup member 24 is in the fully pulled position as seen in FIGS. 18 and 19 and in the wire (shift) position adjacent the fully pulled position as seen in FIGS. 16 and 17. Thus, the stop portion 34*c* contacts the stopper 72*d* to maintain the wire pulling member 34 in a proper orientation with respect to the pull operating lever 30, when the wire takeup member 24 is in the fully pulled position or the wire (shift) position adjacent the fully pulled position.

The contact portion 34*d* of the wire pulling member 34 is configured and arranged to be contacted by the contact extension 22*c* of the wire positioning member 22 during a wire releasing operation of the release operating lever 40. During a wire releasing operation, the contact extension 22*c* contacts the contact portion 34*d* so that the wire positioning member 22 and the wire pulling member 34 move together with the movement of the release operating lever 40. In this way, the positioning abutments 22*d* of the wire positioning member 22 and the drive teeth 34*e* of the wire pulling member 34 that are currently engaged are moved out of engagement with the abutments 66*a* and 66*b* of the wire takeup member 24 to release the wire takeup member 24. The amount of movement of the release operating lever 40 will determine the amount of the inner wire 17*a* that will be released in a single progressive movement of the release operating lever 40 from the rest position to the operated (wire releasing) position.

The drive teeth or abutments 34*e* of the wire pulling member 34 are configured and arranged to selectively and individually contact the single driven abutment 66*b* on the attachment part 66 of the wire takeup member 24 so as to pull the wire takeup member 24 during a wire pulling operation. The drive teeth 34*e* are arranged along an arc in a ratchet type (stair-like) configuration such that when the drive teeth 34*e* progressively moves out of the path of the single driven abutment 66*b* on the attachment part 66 of the wire takeup member 24 during a wire releasing operation.

Figure 32:
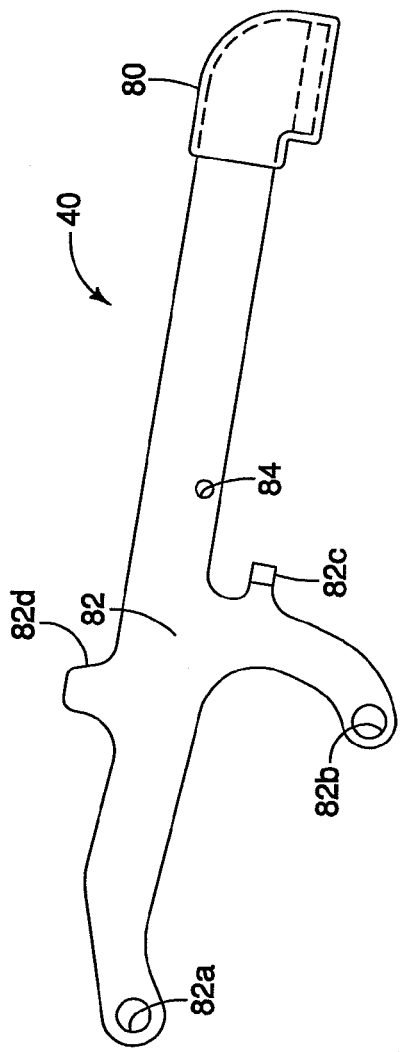
FIG. 32 is a top plan view of the release operating lever of the cable operating mechanism.

As seen in FIGS. 2, 3 and 32, the release operating lever 40 is preferably a hard rigid member formed of a suitable rigid material such as a metal plate material. The release operating lever 40 is pivotally mounted to the fixed member 20 by the pivot pin 62 so as to pivot about the second pivot axis A2. The release operating lever 40 is a trigger type lever that returns to the rest position after being moved from the rest position to an operated (wire releasing) position. The primary biasing element 42 applies a biasing force to the release operating lever 40 for urging the release operating lever 40 about the second pivot axis A2 so as to rest against the release operating lever stop 55. Thus, in a top plan view as seen in FIG. 2, 5, 7 and 9, the release operating lever 40 is biased in the clockwise direction about the second pivot axis A2 by the primary biasing element 42.

As seen in FIG. 32, the release operating lever 40 basically includes a user operating portion 80 and a mounting portion 82. The user operating portion 80 has a hole 84 for attaching one end of the primary biasing element 42. The other end of the primary biasing element 32 is attached to the spring mounting tab 57 of the fixed member 20 as mentioned above.

The mounting portion 82 includes a main pivot hole 82a, a secondary pivot hole 82b, a spring mounting tab 82c and a release member engagement portion 82d. The main pivot hole 82a receives the pivot pin 62 for pivotally supporting the release operating lever 40 on the fixed member 20. The secondary pivot hole 82b receives a pivot pin 86 for pivotally supporting the wire releasing member 44 on the release operating lever 40. The secondary biasing element 46 of the wire releasing mechanism 28 has a first end attached to the wire releasing member 44 and a second end attached to the spring mounting tab 82c of the release operating lever 40. Preferably, the secondary biasing element 46 of the wire releasing mechanism 28 is a coil tension spring. As mentioned above, the wire releasing member 44 is biased by the secondary biasing element 46. The biasing force of the secondary biasing element 46 urges the wire releasing member 44 against the release member engagement portion 82d when the bicycle cable operating mechanism 12 is in the fully released position (i.e., when the tip or driven tooth 22e of the wire positioning member 22 is spaced from the wire releasing member 44).

Figure 34:
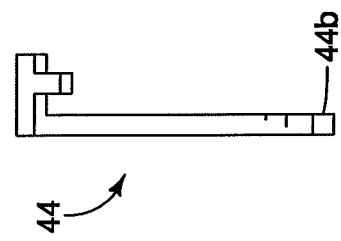
FIG. 34 is a side elevational view of the wire releasing member of the cable operating mechanism.
Figure 33:
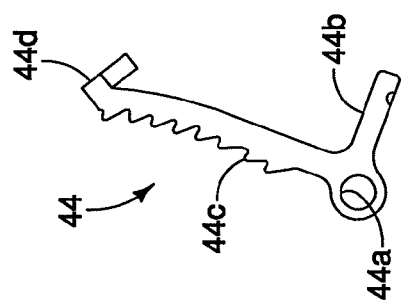
FIG. 33 is a top plan view of the wire releasing member of the cable operating mechanism.

As seen in FIGS. 2, 33 and 34, the wire releasing member 44 is preferably a hard rigid member formed of a suitable rigid material such as a metal plate material. The wire releasing member 44 includes a pivot hole 44a, a spring mounting tab 44b, a plurality of release abutments 44c and a contact extension 44d. As mentioned above, the wire releasing member 44 is pivotally mounted to the mounting portion 82 of the release operating lever 40 by the pivot pin 86. Thus, the wire releasing member 44 is pivotally mounted with respect to the release operating lever 40 about a fourth pivot axis A4.

The secondary biasing element 46 of the wire releasing mechanism 28 has a first end attached to the spring mounting tab 44b of the wire releasing member 44 and a second end attached to the spring mounting tab 82c of the release operating lever 40. Thus, the secondary biasing element 46 is attached to the spring mounting tab 82c to apply a biasing force to the wire releasing member 44 for urging the wire releasing member 44 about the third pivot axis A4, as mentioned above, such that one of the release abutments 44c engages the tip or driven tooth 22e of the wire positioning member 22.

The release abutments 44c are configured to selectively engage the tip or driven tooth 22e of the wire positioning member 22 to move the positioning member 22 during a wire releasing operation of the wire releasing member 44 by pivoting the release operating lever 40 on the fixed member 20 from a rest position to an operated (wire releasing) position. A different one of the release abutments 44c engages the tip or driven tooth 22e of the wire positioning member 22 depending on the current wire (shift) position of the wire takeup member 24.

The wire releasing member 44 is preferably a flat plate except for the contact extension 44d, which extends perpendicular to the rest of the wire releasing member 44. The contact extension 44d is configured and arranged to engage the upper control (contact) surface 74a of the pull operating lever 30 to control the movement of the release member 44 during a wire pulling operation of the pull operating lever 30. In particular, when the positioning member 22 moves from one wire (shift) position to the next adjacent wire (shift) position during a wire pulling operation of the pull operating lever 30, the tip or driven tooth 22e of the wire positioning member 22 must override one tooth of the release member 44. Thus, when the pull operating lever 30 is moved during a wire pulling operation of the pull operating lever 30, the upper control (contact) surface 74a will contact the contact extension 44d and rotate the release member 44 slightly in a clockwise direction as viewed from a top plan view. This rotation of the release member 44 moves the release member 44 away from the tip or driven tooth 22e of the wire positioning member 22. Thus, the driven tooth 22e disengages from the release abutment 44c that was currently engaged so that the driven tooth 22e can pass over the release abutment 44c that was currently engaged to the next adjacent one of the release abutment 44c.

A wire pulling operation of the bicycle cable operating mechanism 12 will now be briefly discussed when the bicycle cable operating mechanism 12 is used to shift the rear derailleur 16, which is a top normal type of rear derailleur. Basically, the rider pushes the pull operating lever 30 against the biasing force of the primary biasing element 32 from the rest position to the operated (wire pulling) position to perform the wire pulling operation. When the pull operating lever 30 is pivoted about the first pivot axis A1, the wire pulling member 34 moves with the pull operating lever 30 about the first pivot axis A1. This movement of the wire pulling member 34 causes the drive tooth or abutment 34e that is engaged with the single driven abutment 66b on the attachment part 66 of the wire takeup member 24 to pull the wire takeup member 24 during the wire pulling operation. Thus, the wire takeup member 24 pivots about the first pivot axis A1.

Also, during this pivotal movement of the pull operating lever 30, the single position maintaining abutment 66a on the attachment part 66 of the wire takeup member 24 moves from a current one of the positioning abutments 22d of the wire positioning member 22 to the next adjacent one of the positioning abutments 22d. More specifically, the pivotal movement of the wire takeup member 24 by the wire pulling member 34 causes the single position maintaining abutment 66a to ride over the positioning abutments 22d of the wire positioning member 22. This ratcheting effect is accomplished by arranging the positioning abutments 22d as ratchet teeth and pivotally mounting the wire positioning member 22 on the fixed member 20.

Also, during this pivotal movement of the pull operating lever 30, the upper control (contact) surface 74a of the pull operating lever 30 engages the contact extension 44d of the release member 44 to control the movement of the release member 44 during the wire pulling operation of the pull operating lever 30. In particular, when the positioning member 22 moves from one wire (shift) position to the next adjacent wire (shift) position during the wire pulling operation of the pull operating lever 30, the tip or driven tooth 22e of the wire positioning member 22 must override one tooth of the release member 44. Thus, when the pull operating lever 30 is moved during the wire pulling operation of the pull operating lever 30, the upper control (contact) surface 74a contacts the contact extension 44d and rotates the release member 44 slightly about the fourth pivot axis A4. This rotation of the release member 44 moves the release member 44 away from the tip or driven tooth 22e of the wire positioning member 22. Thus, the driven tooth 22e disengages from the release abutment 44c that was currently engaged so that the driven tooth 22e can pass over the release abutment 44c that was currently engaged to the next adjacent one of the release abutment 44c. On the return swing of the pull operating lever 30, due to the biasing force of the primary biasing element 32, the release member 44 pivots back into engagement with the driven tooth 22e of the wire positioning member 22 to hold the wire positioning member 22. Thus, the current one of the positioning abutments 22d moves out of engagement from the single position maintaining abutment 66a on the attachment part 66 of the wire takeup member 24, and the current one of the drive abutments 34e moves out of engagement from the single driven abutment 66b on the attachment part 66 of the wire takeup member 24.

A wire releasing operation of the bicycle cable operating mechanism 12 will now be briefly discussed when the bicycle cable operating mechanism 12 is used to shift the rear derailleur 16, which a top normal type of rear derailleur. Basically, the rider pushes the release operating lever 40 against the biasing force of the primary biasing element 42 from the rest position to the operated (wire releasing) position to perform the wire releasing operation. When the release operating lever 40 is pivoted about the second pivot axis A2, the wire releasing member 44 moves with the release operating lever 40 about the second pivot axis A2. This movement of the wire releasing member 44 causes the release abutments 44c that is engaged with the driven tooth 22e of the wire positioning member 22 to pivot the wire positioning member 22 about the second pivot axis A2 during the wire releasing operation. In other words, when the release operating lever 40 is moved from the rest position to the operated (wire releasing) position, the release operating lever 40 engages the driven tooth 22e of the wire positioning member 22 to rotate the wire positioning member 22 against the biasing force of the biasing element 63 to release the wire takeup member 24 from one of the positioning abutments 22d.

This pivotal movement of the wire positioning member 22 also causes the contact extension 22c of the wire positioning member 22 to contact the contact portion 34d of the wire pulling member 34 so as to rotate the wire pulling member 34 about the third pivot axis A3 during the wire releasing operation. Thus, during the wire releasing operation, the contact extension 22c contacts the contact portion 34d so that the wire positioning member 22 and the wire pulling member 34 move together with the movement of the release operating lever 40. In this way, the positioning abutments 22d of the wire positioning member 22 and the drive teeth 34e of the wire pulling member 34 that are currently engaged are moved out of engagement with the abutments 66a and 66b of the wire takeup member 24 to release the wire takeup member 24. In other words, these pivotal movements of the positioning member 22 and the wire pulling member 34 causes the wire takeup member 24 to pivot in the wire releasing direction about the first pivot axis A1 due to the force of the biasing element 68 and a spring (not shown) of the rear derailleur 16.

Due to the drive abutments 34e and the positioning abutments 22d being ratchet teeth with a stair-like configuration that is arranged on an arc as shown, the abutments 66a and 66b on the attachment part 66 of the wire takeup member 24 engage the next adjacent ones of the abutments 34e and 22d as the release operating lever 40 is pivoted further about the second pivot axis A2. The amount of movement of the release operating lever 40 will determine the amount of the inner wire 17a that will be released in a single progressive movement of the release operating lever 40 from the rest position to the operated (wire releasing) position. Thus, the number of wire (shift) positions that are released will depend on how far the release operating lever 40 is pivoted.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cable operating mechanism comprising:
   a fixed member;
   a wire takeup member movably mounted relative to the fixed member,
   a single position maintaining abutment non-movably mounted directly on and directly fixed to the wire takeup member with no relative movement therebetween, the single position maintaining abutment and the wire takeup member moving together as a unit relative to the fixed member during a wire releasing operation; and
   a positioning member pivotally mounted relative to the fixed member, the positioning member having a plurality of positioning abutments that selectively engage the single position maintaining abutment to position the wire takeup member in one of a plurality of predetermined wire positions corresponding to rest positions of the wire takeup member.

2. The cable operating mechanism according to claim 1, wherein
the wire takeup member is pivotally mounted relative to the fixed member about a first pivot axis; and
the positioning member is pivotally mounted relative to the fixed member about a second pivot axis that is offset from the first pivot axis.

3. The cable operating mechanism according to claim 1, further comprising
a wire releasing member including a plurality of release abutments that selectively engage the positioning member to move the positioning member during the wire releasing operation.

4. The cable operating mechanism according to claim 3, wherein
the positioning member and the wire releasing member move relative to each other upon a single progressive movement of the wire releasing member during the wire releasing operation, a currently engaged one of the positioning abutments being released from the single position maintaining abutment and another non-adjacent one of the positioning abutments which is non-adjacent to the currently engaged one of the positioning abutments engaging the single position maintaining abutment to release the wire takeup member relative to the fixed member for movement through at least two of the predetermined wire positions.

5. The cable operating mechanism according to claim 1, further comprising
a wire pulling member movably mounted relative to the fixed member, the wire pulling member including a plurality of drive abutments selectively engaging a driven abutment of the wire takeup member to drive the driven abutment to move the wire takeup member during a wire pulling operation of the wire pulling member.

6. The cable operating mechanism according to claim 3, further comprising
a release operating lever pivotally mounted relative to the fixed member to move the wire takeup member in a wire releasing direction relative to the fixed member, the wire releasing member being mounted on the release operating lever so as to move with the release operating lever during the wire releasing operation and also being movable relative to the release operating lever.

7. The cable operating mechanism according to claim 1, further comprising
a pull operating lever pivotally mounted relative to the fixed member to move the wire takeup member in a wire pulling direction relative to the fixed member; and
a wire pulling member including a plurality of drive abutments selectively engaging a driven abutment of the wire takeup member, the wire pulling member being mounted on the pull operating lever so as to move with the pull operating lever during a wire pulling operation and also being movable relative to the pull operating lever during the wire releasing operation.

8. The cable operating mechanism according to claim 7, further comprising a release operating lever pivotally mounted relative to the fixed member to move the wire takeup member in a wire releasing direction relative to the fixed member; and
a wire releasing member including a plurality of release abutments that selectively engage the positioning member to move the positioning member during the wire releasing operation, the wire releasing member being mounted on the release operating lever so as to move with the release operating lever during the wire releasing operation and also being movable relative to the release operating lever during the wire pulling operation.

9. The cable operating mechanism according to claim 8, wherein
the wire pulling member and the positioning member are operatively coupled to the release operating lever, the release operating lever moving the wire pulling member and the positioning member together as the release operating lever moves during the wire releasing operation.

10. A cable operating mechanism comprising:
a fixed member;
a wire takeup member pivotally mounted relative to the fixed member about a first pivot axis;
a positioning member pivotally mounted relative to the fixed member about a second pivot axis that is offset from the first pivot axis, the positioning member including a plurality of positioning abutments that selectively engage the wire takeup member and selectively maintain the wire takeup member in one of a plurality of predetermined wire positions corresponding to the rest postions of the wire taken member; and
a wire releasing member including a plurality of release abutments that selectively engage the positioning member and move the positioning member during a wire releasing operation of the wire releasing member, the wire releasing member engaging a same one of the positioning abutments in at least two of the predetermined wire positions of the wire takeup member.

11. The cable operating mechanism according to claim 10, wherein
the positioning member and the wire releasing member move relative to each other upon a single progressive movement of the wire releasing member during the wire releasing operation of the wire releasing member, a currently engaged one of the positioning abutments being released from a position maintaining abutment of the wire takeup member and another non-adjacent one of the positioning abutments which is non-adjacent to the currently engaged one of the positioning abutments engaging the position maintaining abutment to release the wire takeup member relative to the fixed member for movement through at least two of the predetermined wire positions.

12. The cable operating mechanism according to claim 10, further comprising
a wire pulling member movably mounted relative to the fixed member, the wire pulling member including a plurality of drive abutments selectively engaging a driven abutment of the wire takeup member to drive the driven abutment to move the wire takeup member during a wire pulling operation of the wire pulling member.

13. The cable operating mechanism according to claim 10, further comprising a release operating lever pivotally mounted relative to the fixed member to move the wire takeup member in a wire releasing direction relative to the fixed member, the wire releasing member being mounted on the release operating lever so as to move with the release operating lever during the wire releasing operation and also being movable relative to the release operating lever.

14. The cable operating mechanism according to claim 10, further comprising
a pull operating lever pivotally mounted relative to the fixed member to move the wire takeup member in a wire pulling direction relative to the fixed member; and
a wire pulling member including a plurality of drive abutments selectively engaging a driven abutment of the wire takeup member, the wire pulling member being mounted on the pull operating lever so as to move with the pull operating lever during a wire pulling operation and also being movable relative to the pull operating lever during a wire releasing operation.

15. The cable operating mechanism according to claim 14, further comprising
a release operating lever pivotally mounted relative to the fixed member to move the wire takeup member in a wire releasing direction relative to the fixed member, and the wire releasing member being mounted on the release operating lever so as to move with the release operating lever during the wire releasing operation and also being movable relative to the release operating lever during the wire pulling operation.

16. The cable operating mechanism according to claim 15, wherein the wire pulling member and the positioning member are operatively coupled to the release operating lever, the release operating lever moving the wire pulling member and the positioning member together as the release operating lever moves during the wire releasing operation.

17. The cable operating mechanism according to claim 10, wherein
the first pivot axis and the second pivot axis extend parallel to each other.

18. The cable operating mechanism according to claim 10, wherein
the wire takeup member is engaged with a different one of the positioning abutments at each of the plurality of predetermined wire positions corresponding to the rest positions of the wire takeup member.

19. The cable operating mechanism according to claim 10, wherein
the wire releasing member does not engage any of the positioning abutments in at least one of the predetermined wire positions of the wire takeup member.

20. A cable operating mechanism comprising:
a fixed member;
a wire takeup member pivotally mounted relative to the fixed member;
a driven abutment fixed to the wire takeup member with no relative movement therebetween, the driven abutment and the wire takeup member moving together as a unit relative to the fixed member as the wire takeup member pivots relative to the fixed member; and
a wire pulling member movably mounted relative to the fixed member and the wire takeup member, the wire pulling member including a plurality of drive abutments selectively engaging the driven abutment to drive the driven abutment, the wire pulling member moving the wire takeup member as the wire pulling member moves during the wire pulling operation of the wire pulling member.

21. The cable operating mechanism according to claim 20, further comprising
a positioning member pivotally mounted relative to the fixed member, the positioning member having a plurality of positioning abutments that selectively engage a position maintaining abutment of the wire takeup member to position the wire takeup member in one of a plurality of predetermined wire positions corresponding to rest positions of the wire takeup member.

22. The cable operating mechanism according to claim 21, wherein
the wire takeup member is pivotally mounted relative to the fixed member about a first pivot axis; and
the positioning member is pivotally mounted relative to the fixed member about a second pivot axis that is offset from the first pivot axis.

23. The cable operating mechanism according to claim 21, further comprising
a wire releasing member including a plurality of release abutments that selectively engage the positioning member to move the positioning member during a wire releasing operation of the wire releasing member.

24. The cable operating mechanism according to claim 23, wherein
the positioning member and the wire releasing member move relative to each other upon a single progressive movement of the wire releasing member during the wire releasing operation of the wire releasing member, a currently engaged one of the positioning abutments being released from the position maintaining abutment and another non-adjacent one of the positioning abutments which is non-adjacent to the currently engaged one of the positioning abutments engaging the position maintaining abutment to release the wire takeup member relative to the fixed member for movement through at least two of the predetermined wire positions.

25. The cable operating mechanism according to claim 23, further comprising
a release operating lever pivotally mounted relative to the fixed member to move the wire takeup member in a wire releasing direction relative to the fixed member, the wire releasing member being mounted on the release operating lever so as to move with the release operating lever during the wire releasing operation and also being movable relative to the release operating lever.

26. The cable operating mechanism according to claim 20, further comprising
a pull operating lever pivotally mounted relative to the fixed member to move the wire takeup member in a wire pulling direction relative to the fixed member, the wire pulling member being mounted on the pull operating lever so as to move with the pull operating lever during the wire pulling operation and also being movable relative to the pull operating lever during a wire releasing operation.

27. The cable operating mechanism according to claim 26, further comprising
a positioning member pivotally mounted relative to the fixed member, the positioning member having a plurality of positioning abutments that selectively engage a position maintaining abutment of the wire takeup member to position the wire takeup member in one of a plurality of predetermined wire positions corresponding to rest positions of the wire takeup member; and a release operating lever pivotally mounted relative to the fixed member to move the wire takeup member in a wire releasing direction relative to the fixed member.

28. The cable operating mechanism according to claim 27, further comprising
a wire releasing member including a plurality of release abutments that selectively engage the positioning member to move the positioning member during the wire releasing operation of the wire releasing member, the wire releasing member being mounted on the release operating lever so as to move with the release operating lever during the wire releasing operation and also being movable relative to the release operating lever during the wire pulling operation.

29. The cable operating mechanism according to claim 27, wherein
the wire pulling member and the positioning member are operatively coupled to the release operating lever, the release operating lever moving the wire pulling member and the positioning member together as the release operating lever moves during the wire releasing operation.

30. A cable operating mechanism comprising:
a fixed member;
a wire takeup member pivotally mounted relative to the fixed member about a first pivot axis;
a positioning member pivotally mounted relative to the fixed member about a second pivot axis that is offset from the first pivot axis, the positioning member including a plurality of positioning abutments that selectively engage the wire takeup member to selectively maintain the wire takeup member in one of a plurality of predetermined wire positions corresponding to rest positions of the wire takeup member; and
a wire releasing member including a plurality of release abutments that selectively engage the positioning member to move the positioning member during a wire releasing operation of the wire releasing member, the wire releasing member engaging a same one of the positioning abutments in at least two of the predetermined wire positions of the wire takeup member,
the positioning abutments of the positioning member being arranged along an arc in a stair configuration relative to the second pivot axis, each of the positioning abutments having a respective radial distance measured from the second pivot axis to a radially outermost point on each of the positioning abutments, to the second pivot axis, the respective radial distances of the positioning abutments all being different from each other.

* * * * *